(12) United States Patent
Gonzalez et al.

(10) Patent No.: US 9,965,736 B2
(45) Date of Patent: May 8, 2018

(54) METHOD, APPARATUS AND SYSTEM FOR TRANSPARENT TRACKING OF WORKER PERFORMANCE

(71) Applicant: HOUND DOG, LLC, Royal Oaks, CA (US)

(72) Inventors: Abel Gonzalez, Salinas, CA (US); Alvaro Gonzalez, Salinas, CA (US); Antonio Sabarez, II, Monterey, CA (US)

(*) Notice: Subject to any disclaimer, the term of this patent is extended or adjusted under 35 U.S.C. 154(b) by 1205 days.

(21) Appl. No.: 13/948,594

(22) Filed: Jul. 23, 2013

(65) Prior Publication Data
US 2015/0012338 A1 Jan. 8, 2015

Related U.S. Application Data

(63) Continuation-in-part of application No. 13/933,752, filed on Jul. 2, 2013, now abandoned.

(51) Int. Cl.
*G06Q 10/06* (2012.01)

(52) U.S. Cl.
CPC .......................... *G06Q 10/06398* (2013.01)

(58) Field of Classification Search
None
See application file for complete search history.

(56) References Cited

U.S. PATENT DOCUMENTS

| | | | |
|---|---|---|---|
| 8,148,701 B2 | 4/2012 | Yoder | |
| 8,373,142 B2 | 2/2013 | Yoder | |
| 8,961,897 B2 | 2/2015 | Faran | |
| 2008/0172311 A1* | 7/2008 | Curran | G06Q 10/06 705/32 |
| 2013/0048720 A1* | 2/2013 | Lewis | G06Q 10/00 235/382 |

* cited by examiner

*Primary Examiner* — Kristy A Haupt
(74) *Attorney, Agent, or Firm* — Patrick Reilly

(57) ABSTRACT

A method, system and device are provided that collect and provide information related to worker productivity. The goods may be or include consumer products, commodities, equipment, food, food products, agricultural supplies and agricultural products. A label may be employed that includes a display screen, a bar code, a quick response code, an RFID chip and/or a radio frequency or photonic communications device to aid tracking of accomplished piecework and worker behavior. The worker may confirm documentation of piecework credit by both displays of piecework counts by the badge and by accessing a database server.

17 Claims, 24 Drawing Sheets

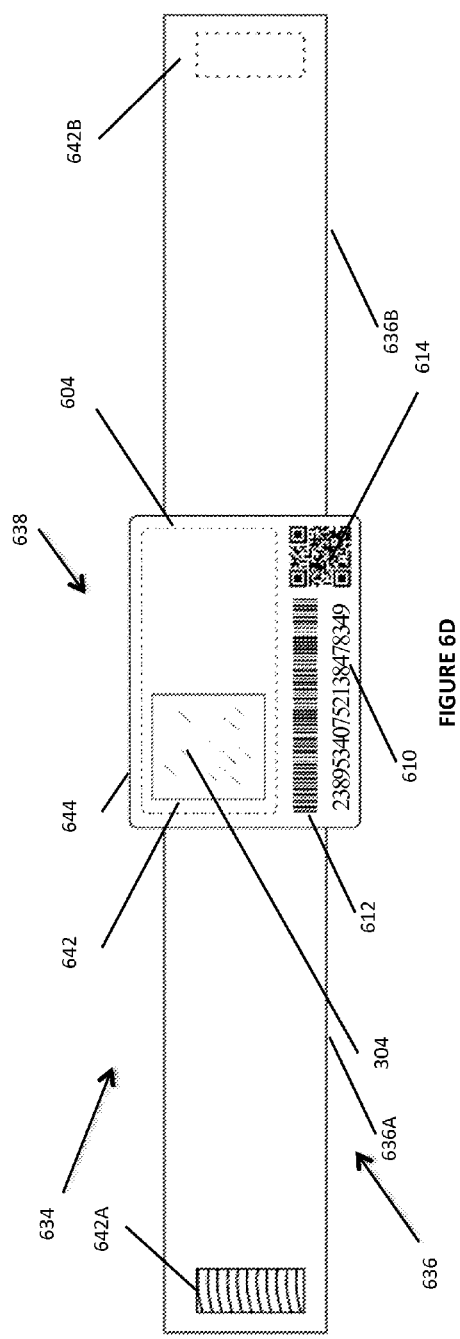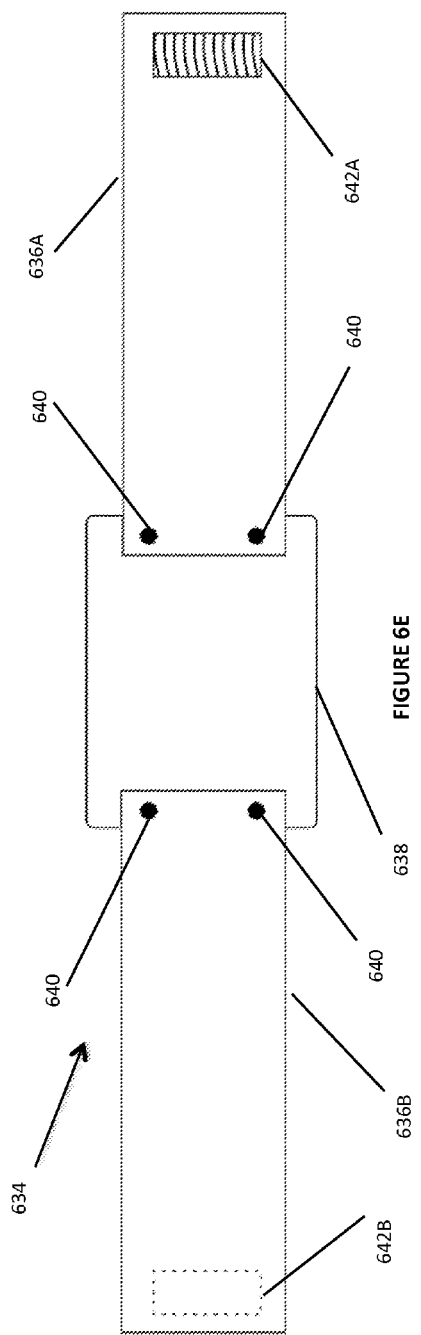

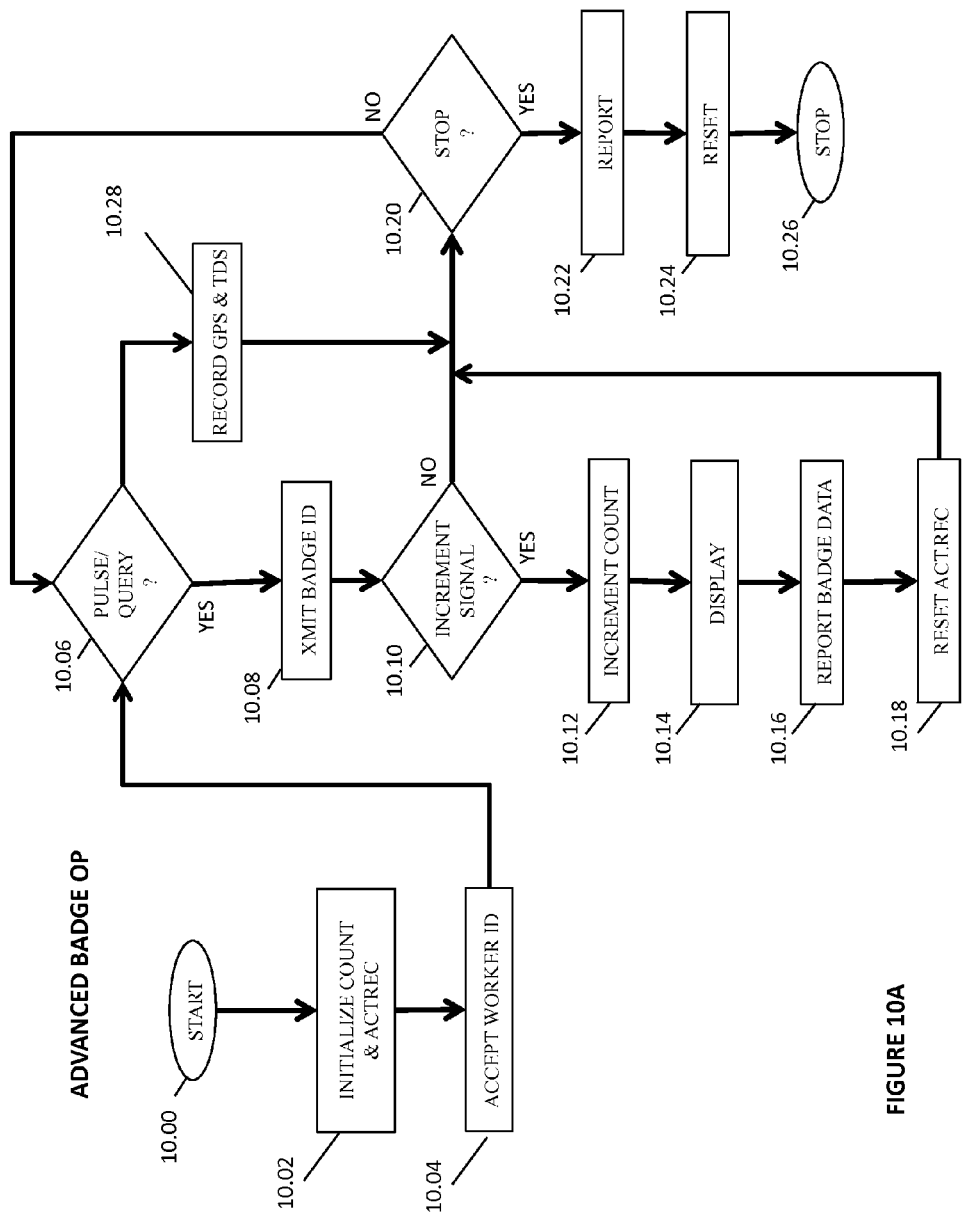

| BADGE.ID.03 | BGPS.01 | BTDS.01 | BGPS.02 | BTDS.02 |
|---|---|---|---|---|
| | BGPS.03 | BTDS.03 | BGPS.N | BTDS.N |

ACT.REC

FIGURE 10B

| BADGE.ID.03 | WORKER.ID | COUNT | B3.ADDR | DB.ADDR |
|---|---|---|---|---|

FIGURE 10C

| SREC.ID.01 | RDR.ID | BADGE.ID | WORKER.ID |
| TDS.01 | GPS.01 | BOX.ID | UNIT.ID |
| LOCAL.ID | ACT.REC | ACT.REC | ACT.REC |

| DB.ADDR | RDR.ADDR | SREC.02 |

METHOD, APPARATUS AND SYSTEM FOR TRANSPARENT TRACKING OF WORKER PERFORMANCE

This Nonprovisional patent application is a Continuation-in-Part of co-pending U.S. Nonprovisional patent application Ser. No. 13/933,752 titled "METHOD AND SYSTEM FOR TRACKING SHIPPED UNITS DURING MOVEMENT OF GOODS WITHIN SUPPLY CHAIN CHANNELS" as filed on Jul. 2, 2013. U.S. Nonprovisional patent application Ser. No. 13/933,752 is incorporating in its entirety into the present Nonprovisional patent application. The present Nonprovisional patent application claims date of priority of U.S. Nonprovisional patent application Ser. No. 13/933,752.

BACKGROUND

1. Technical Field

The present invention relates generally to information technology and more particularly to systems and methods for associating and documenting human identity in relation to productivity and behavior.

2. Description of the Related Art

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Human activity is often required in commercial and non-commercial processes applied to collect, pack, ship and deliver numerous agricultural products, consumer goods and industrial materials. In many worksites, compensation is based on piece-work principles, wherein earnings provided to individual workers are wholly or partially tied or related to a measure of productivity, such as a quantity of goods or material gathered or repositioned, personally credited to each identified worker. Yet it is not unusual that a count of fully performed work is difficult to be assessed, documented or asserted by the individual worker. When a worker lacks confidence that his or her work will be compensated as promised in a piecework arrangement, productivity of the doubtful worker may be impaired and the morale of a work team may be degraded. Such a lowering of team morale may impact the effectiveness of a venture or other group activity in a myriad of ways. Yet the prior art fails to optimally track and document individual worker output in ways that raise worker expectations of fair compensation in low trust environments.

In addition, the prior art fails to optimally track and document the interaction of identified persons with foodstuffs, agricultural products, goods and materials at their origins or in the stream of commerce. This additional defect of the prior art generally reduces levels of confidence in the security of food and other potential vulnerable materials and thereby affects the ability of prior art systems and methods to increase public confidence in the quality and safety of various essential goods, such as food, medicine and fuel.

There is therefore a long felt need to acquire and document information that more reliably and transparently relates human identity to productive activity, human behavior and optionally particular goods or materials.

SUMMARY AND OBJECTS OF THE INVENTION

Toward these objects and other objects that are made obvious to one of ordinary skill in the art in light of the present disclosure, a method, system and device are provided that collect and provide information related to goods or materials, to include, but not limited to, commodities, medicine, chemicals, consumer products, industrial wares, and/or food products.

This Summary is provided to introduce a selection of concepts in a simplified form that are further described below in the Detailed Description. Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In a first aspect of the method of the present invention (hereinafter, "invented method") a system is provided that tracks and documents accomplished work as performed by individual workers. The system includes a portable device, such as a badge or a cellular telephone that receives a count of work units accomplished and renders the count by visual, auditory or other sensory means. The portable device may present a pattern that identifies the portable device and/or an individual worker, such as a bar code pattern or a quick response code pattern (hereinafter, "QR code") that may be read by an automated reading device adapted to sense and discern the values of the pattern. The device may additionally or alternatively store a badge and/or a worker identifier in a memory circuit, such as a random access memory, a reprogrammable memory or reprogrammable register.

The device may additionally or alternatively store the count in a memory circuit, such as a random access memory, a reprogrammable memory or reprogrammable register. The device may optionally include a radio frequency communications interface that receives count updates or count increment instructions from a local device and/or a remote server.

In a yet additional optional aspect of the invented method, a worker may consult a badge and/or a remote server to verify the recordation of the count. The invented method may further optionally enable a worker or other participant to access the count as stored by a remote server by means of a cellular telephone or other network communications-enabled system.

In a still other optional aspect of the invented method, a particular unit or piece of material or goods is associated with one or more workers in a record, whereby the handling or proximity of the one or more identified workers to the particular unit or piece unit is documented for later inspection.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

These and other features, aspects, and advantages of the present disclosure will become better understood when the following detailed description of certain exemplary embodiments is read with reference to the accompanying drawings in which like characters represent like parts throughout the drawings, wherein:

FIG. 6D is a front view of an invented wearable device that includes a strap assembly and is adaptable to house electronic elements of an invented badge of FIG. 3, 4, or 5;

FIG. 6E is a back view of the invented wearable device of FIG. 6D;

FIG. 10A is a flowchart of advanced aspects of the invented method as affected by the third badge of FIG. 5;

FIG. 10B is a block diagram of an exemplary activity record of the third badge reader of FIG. 5;

FIG. 10C is a block diagram of an additional information provided by the third badge reader of FIG. 5 to the badge reader of FIGS. 2 and 7;

DETAILED DESCRIPTION

A worker's faith in the integrity of piecework accounting can affect the worker's morale and productivity. Yet the prior art fails to optimally assure workers that their piecework is being properly counted and accurately recorded. The invented method addresses these concerns of piece workers by providing means for a worker to be immediately assured that a piece work has been counted and optionally provides a method for the worker to later access a recordation of piece work accounting.

Figure 1A:
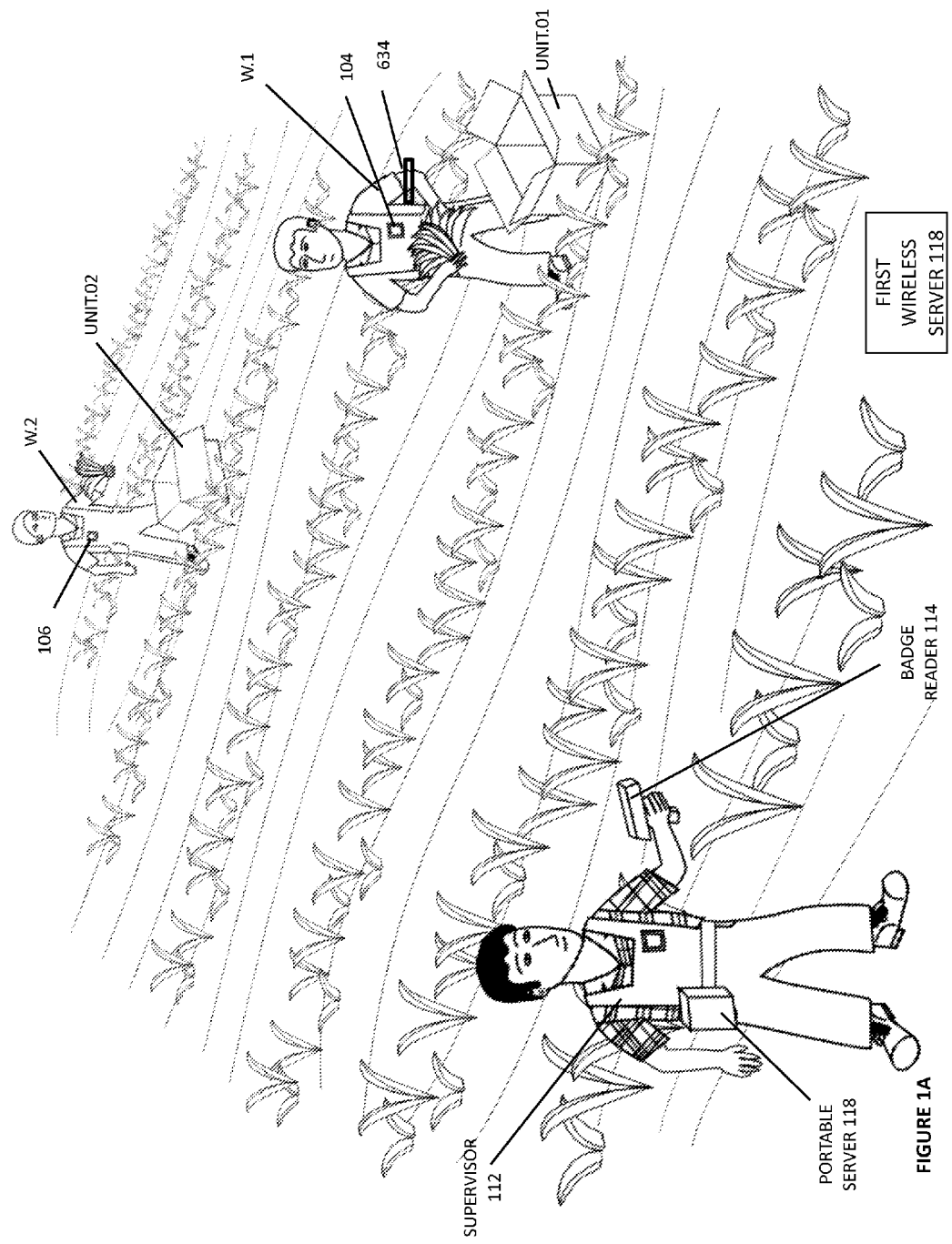
FIG. 1A is a perspective illustration of an agricultural field where piecework is being tracked.
Figure 1B:
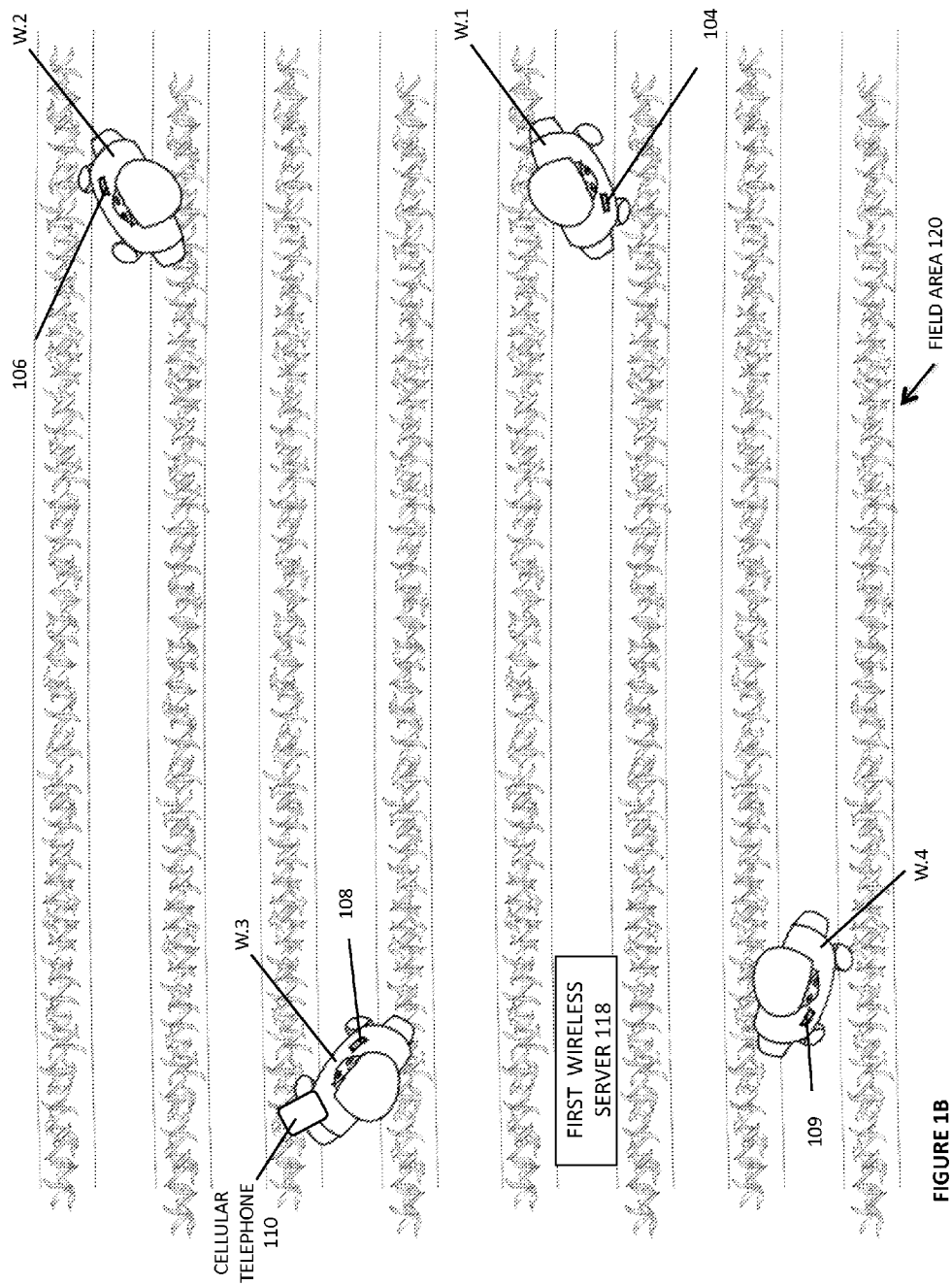
FIG. 1B is a top view of the filed of FIG. 1B and showing workers using invented badges.

Referring now generally to the Figures and particularly to FIGS. 1A and 1B, FIG. 1A is a perspective illustration of a plurality of agricultural workers W.1 & W.2 gathering produce 100 from plants 102 of original growth. As shown in FIG. 1B, each worker W.1-W.N wears a lightweight badge 104-109 and alternatively or additionally a cellular phone 110. Each badge 104-109 preferably weighs less than eight ounces.

It is understood that cellular phone 110 may be adapted and configured to include any or all elements of one or more badges 104-109 and/or provide one or more functional aspects of one or more badges 104-109 as disclosed in the present disclosure. The cellular phone 110 may be a commercially available product that is a bundle of software and hardware, such as an IPHONE™ cellular phone as developed and marketed by Apple, Inc. of Cupertino, wherein the cellular phone 110 includes the hardware, e.g., a digital phone and/or an RFID signal receiver, and software, e.g., an operating system, a web browser, an email client, wireless telephony and radio frequency communications software, and/or bar code and QR code reading software. More particularly, the cellular telephone 110 may be or comprise (c.) an IPHONE™ cellular telephone as marketed by Apple, Inc. of Cupertino, Calif.; (b.) an IPAD™ tablet computer as marketed by Apple, Inc. of Cupertino, Calif.; (c.) an HTC TITAN II™ cellular telephone as marketed by AT&T, Inc. of Dallas, Tex. and running a WINDOWS 7™ operating system as marketed by Microsoft Corporation of Redmond, Wash.; (d.) a GALAXY NEXUS™ smart phone as marketed by Samsung Group of Seoul, Republic of Korea or and running an ANDROID™ software operating system as marketed by Google, Inc. of Mountain View, Calif.; (e.) a TOUGHPAD™ tablet computer as marketed by Panasonic Corporation of Kadoma, Osaka, Japan and running an ANDROID™ operating system as marketed by Google, Inc. of Mountain View, Calif.; or (f.) other suitable mobile electronic device, wireless communications device, computational system or electronic communications device known in the art.

A supervisor 112 is equipped with a badge reader 114 and optionally a portable server 116. It is understood that the badge reader 114 may be adapted to include any or all elements of the portable server 116 and/or provide one or more functional aspects of the portable server 116 as disclosed in the present disclosure. It is further understood that a wireless communications server 118 as shown in FIG. 1B may be optionally or additionally provided, wherein the wireless communications server 118 may be adapted to include any or all elements of the portable server 116 and/or provide one or more functional aspects of the portable server 116 as disclosed in the present disclosure. The portable server 116 preferably weighs less than five pounds and may comprise a cellular telephone 110.

The badge reader 114 is selected and adapted to acquire information from the badges 104-109 and/or cellular telephone 110 by pattern image recognition and/or wireless transmission, such as radio wave frequency or light wave energy transmission. It is preferable but not required that the badge reader 114 be capable of receiving information from the badges 104-109 & cellular telephone 110 at any location within the field area 120, as shown in FIG. 1B.

Referring now generally to the Figures and particularly to FIG. 1B, FIG. 1B is a top view showing the plurality of workers W.1-W.4 and the supervisor 112 positioned within a field area 120. The field area 120 may be designated by an arbitrary exemplary location identifier LOC.ID. The wireless communications server 118 and/or the portable server 116 are preferably, but not necessarily, within communications range of each badge 104-109 and the cellular telephone 110 while these devices 104-110 are present in the field area 120 at the same time as the wireless communications server 118 and/or the portable server 116.

Figure 2:
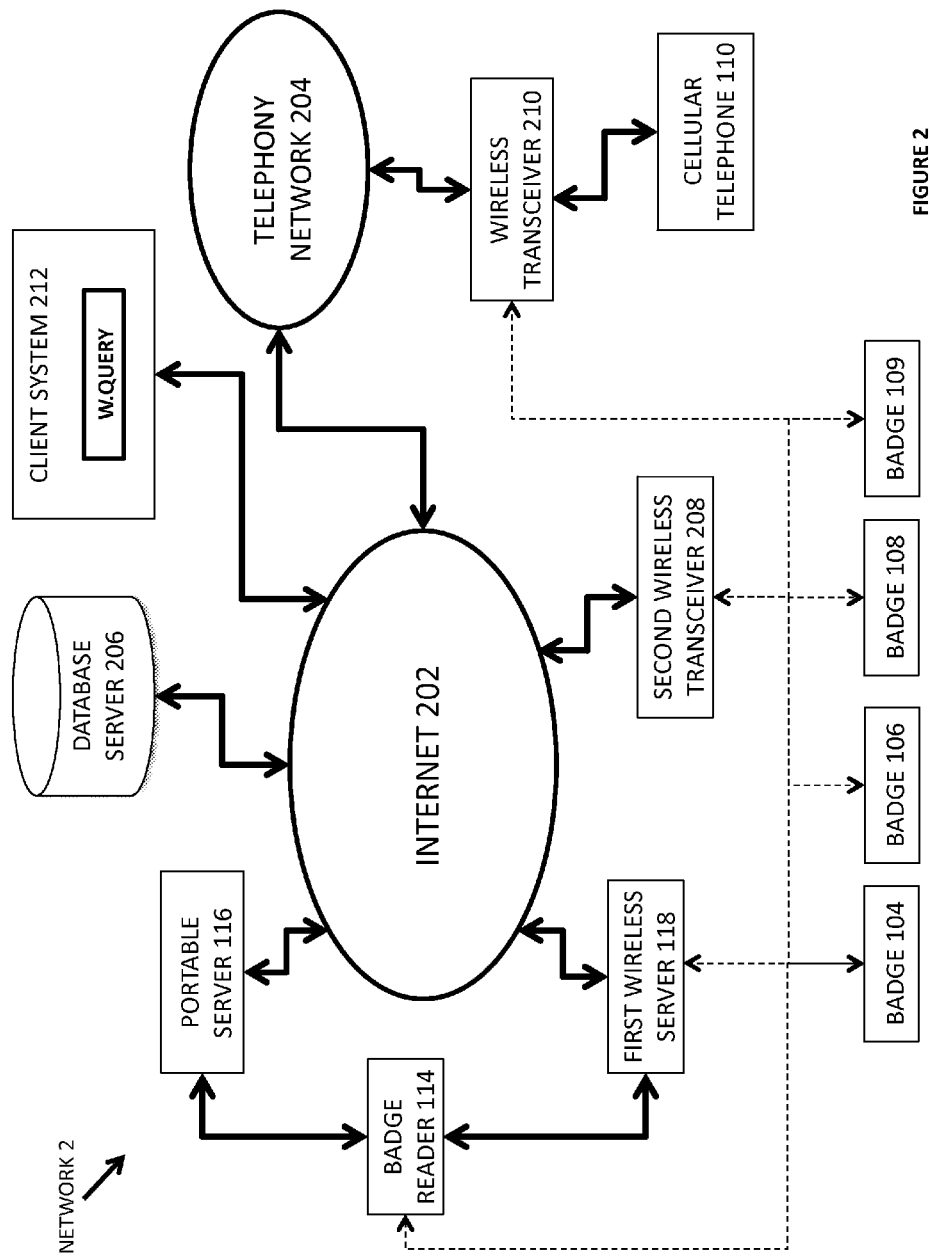
FIG. 2 is a block diagram of an electronics communications network that includes the Internet and a telephony network.

Referring now generally to the Figures and particularly to FIG. 2, FIG. 2 is a network diagram of an electronic communications network 2 (hereinafter, "network 2") that comprises the internet 202 and a telephony network 204. The internet 202 and the telephony network 204 are bi-directionally communicatively coupled, whereby the cellular telephone 110 may communicate with a remote database server 206 via the internet 202 and a telephony network 204. A wireless transceiver 208 may bi-directionally communicatively coupled the cellular telephone 110 with the internet 202, a telephony wireless transceiver 210 and/or a client system 212 may bi-directionally communicatively coupled the cellular telephone 110 with the telephony network 204.

The badge reader 114 may be bi-directionally communicatively coupled with the network 2 via the portable server 116 and/or the wireless communications server 118 and thereby bi-directionally communicate with the remote database server (hereinafter "DB server 206"). It is understood that while the first badge 104 might be adapted or configured to bi-directionally communicate with the badge reader 114, the second badge 106, the third badge 108 and/or the cellular telephone 110 might be adapted and configured to bi-directionally communicate with the badge reader 114 and/or numerous devices and servers, to include the wireless transceiver 208 and telephony wireless transceiver 210.

The cellular telephone 110 and the client system 212 may be used by a worker to access information stored at the DB server 206.

The portable server 116, the wireless server 118, the DB server 206, the first wireless transceiver 208, the second wireless transceiver 210 and/or the client system 212 may be or comprise a bundled hardware and software computer system product, such as (a.) a network-communications enabled THINKSTATION WORKSTATION™ notebook computer marketed by Lenovo, Inc. of Morrisville, N.C.; (b.) a NIVEUS 5200 computer workstation marketed by Penguin Computing of Fremont, Calif. and running a LINUX™ operating system or a UNIX™ operating system; (c.) a network-communications enabled personal computer configured for running WINDOWS XP™, VISTA™ or WINDOWS 7™ operating system marketed by Microsoft Corporation of Redmond, Wash.; (d.) a MACBOOK PRO™ personal computer as marketed by Apple, Inc. of Cupertino, Calif.; or (e.) other suitable mobile electronic device, wireless communications device, computational system or electronic communications device known in the art.

Figure 3:
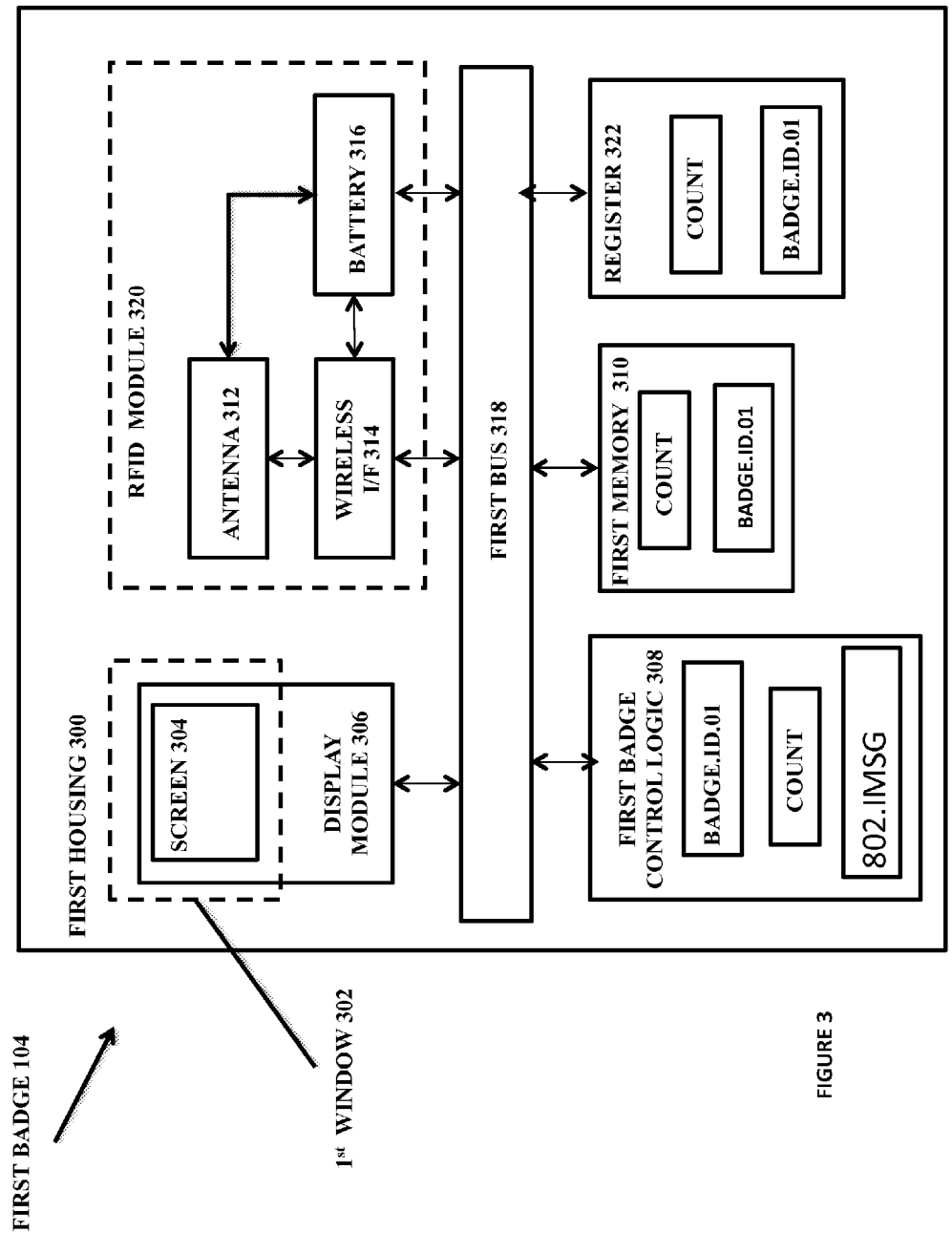
FIG. 3 is a schematic diagram of a first invented badge.

Referring now generally to the Figures and particularly to FIG. 3, FIG. 3 is a block diagram of the first badge 104 that includes a first protective housing 300 that comprises a case 301 coupled with a translucent first window section 302, wherein the first window section 302 is sufficiently translucent to allow a display screen 304 of a display module 306 to be visually discernable to the workers W.1-W.4. The display screen 304 is preferably adapted to contemporaneously present at least three decimal digits and preferably eight or more decimal digits.

The first protective housing 300 is sized, shaped and adapted to contain and protect the electrical and electronic components of the first badge 104 and the signal interconnections and signal pathways of the first badge 104. More particularly, the first badge 104 further includes a first badge control logic 310, a solid-state memory 310, an antenna 312, a wireless interface 314 and a battery 316. A first power and communications bus 318 (hereinafter, "first bus 318") bi-directionally communicatively couples the display module 306, the first badge control logic 306, the solid-state memory 310, the antenna 312, and the wireless interface 314. The first bus 318 further distributes electrical power stored in the battery 316 to the display module 306, the first badge control logic 308, the solid-state memory 310, the antenna 312, and the wireless interface 314. Additionally or alternatively, the antenna 312 may be adapted to receive electrical power by mean of radio wave transmission and provide the received electrical power to the battery 316 for subsequent distribution within the first badge 104. The antenna 312 and/or the battery 316 may be adapted to deliver electrical power to the wireless interface 314 without passing through the first bus 318.

The first badge 104 may additionally, alternatively or optionally include an RFID module 320 that comprises the antenna 312, the wireless interface 314 and/or the battery 316, their interconnections and signal pathways to the first bus 318. An exemplary first badge identifier BADGE.ID.01 may be stored in the first badge control logic 308 and/or the memory 312. The memory 312 may be adapted to not enable any modification of the exemplary first badge identifier BADGE.ID.01 and the first badge control logic 308 may persistently, revocably or irrevocably store the first badge identifier BADGE.ID.01.

The first badge control logic 308 is adapted to direct the first badge 104 in accordance with the aspects of the invented method and to bi-directionally communicate with the badge reader 114, to increment, decrement or reset a work unit count value COUNT, and direct the display module to display a visual representation of the work unit count value COUNT (hereinafter, "count value COUNT") in the display screen 304.

The count value COUNT may be stored in the memory 310 or an optional or additional register 322, wherein the memory 310 and/or the register 322 are adapted to increment, decrement or reset the count value COUNT as directed by the first badge control logic 308. The antenna is preferably both (1.) receive and transfer electrical power received from the badge reader 114 to the battery 316 and/or the wireless interface 314, and (2.) bi-directionally communicatively couple the first wireless interface 314 with the badge reader 114 and/or additional equipment 116, 118 & 206-210 of the network 2.

Figure 4:
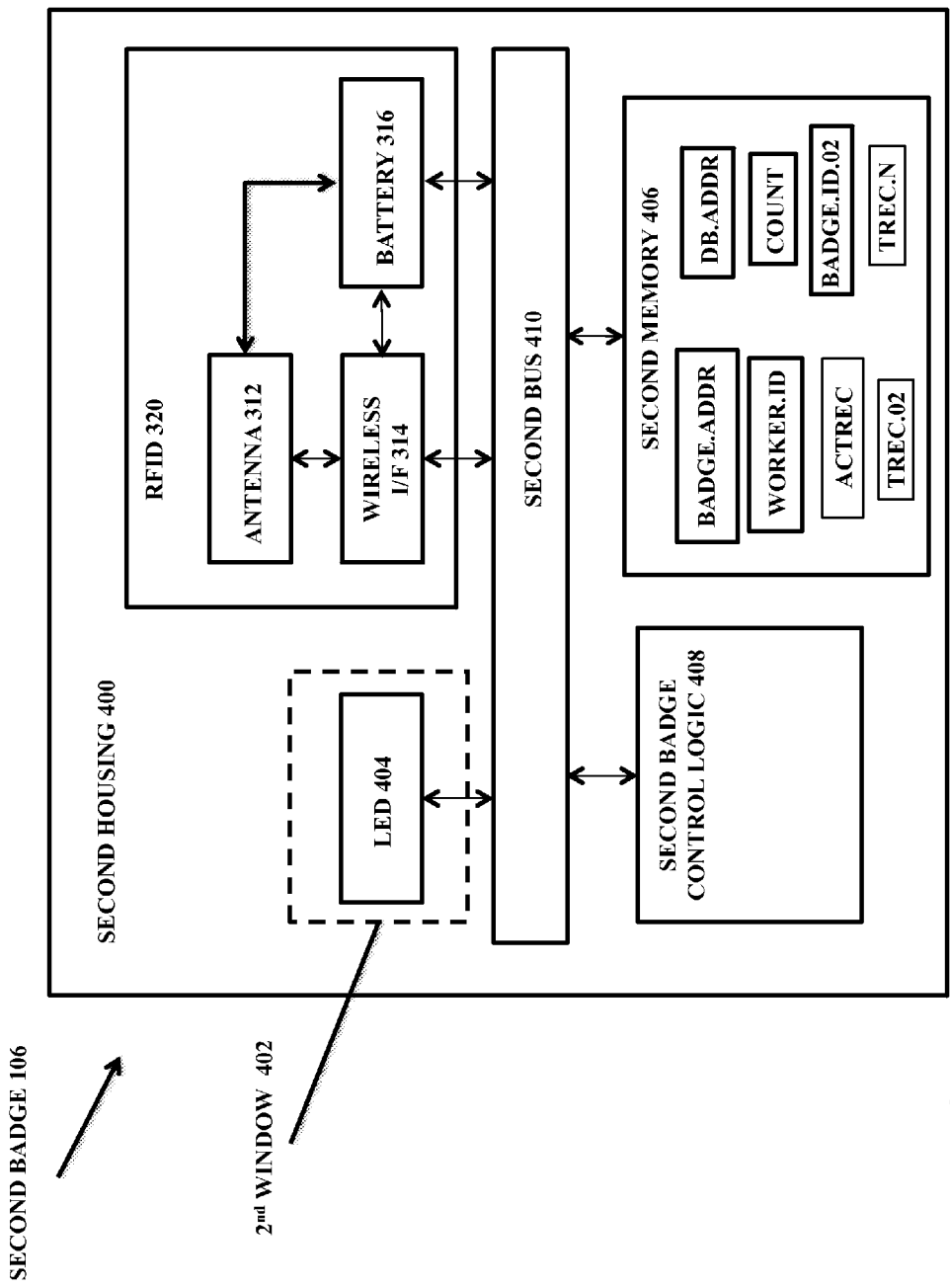
FIG. 4 is a schematic diagram of a second invented badge.

Referring now generally to the Figures and particularly to FIG. 4, FIG. 4 is a block diagram of the second badge 106. The second badge 106 includes a second protective housing 400 that comprises a sufficiently translucent second window section 402 to allow a light emitting diode module 404 to be visually discernable to the workers W.1-W.4. The second window section 402 and a second case 403 in combination form the second housing 400 and substantially enclose and protect the electronic elements of the second badge 106.

The light emitting module diode module 404 (hereinafter, "LED 404") is preferably adapted to present contemporaneously and visually at least three decimal digits and preferably eight or more decimal digits. The second protective housing 400 is sized, shaped and adapted to contain and protect the electrical and electronic components of the second badge 106 and the signal interconnections and signal pathways of the second badge 106.

A second badge memory 406 includes the count value COUNT, and optional values, to include a second badge identifier BADGE.ID.02, a server network DB.ADDR associated with the DB server 206, a badge network address BADGE.ADDR, an exemplary worker identifier WORKER.ID and one or more temporary records TREC.01-TREC.N. The server network DB.ADDR may be used to address electronic messages to the DB server 206, and the badge network address BADGE.ADDR may be used to identify the second badge 106 to the network 2 and to address electronic messages to the second badge 106. The exemplary worker identifier WORKER.ID may persistently or temporarily associate a particular human identity with the second badge 106.

A second badge control logic 408 is adapted to direct the first badge to bi-directionally communicate with the badge reader 114, to increment, decrement or reset a work unit count value COUNT, to direct the LED module 404 to display a visual representation of the count value COUNT, the second badge identifier BADGE.ID.02 and/or to instantiate or perform additional aspects of the invented method as disclosed in the present disclosure. More particularly, the second badge control logic 408 may be further adapted to modify the worker identifier WORKER.ID or other value stored in the second memory 406.

Figure 5:
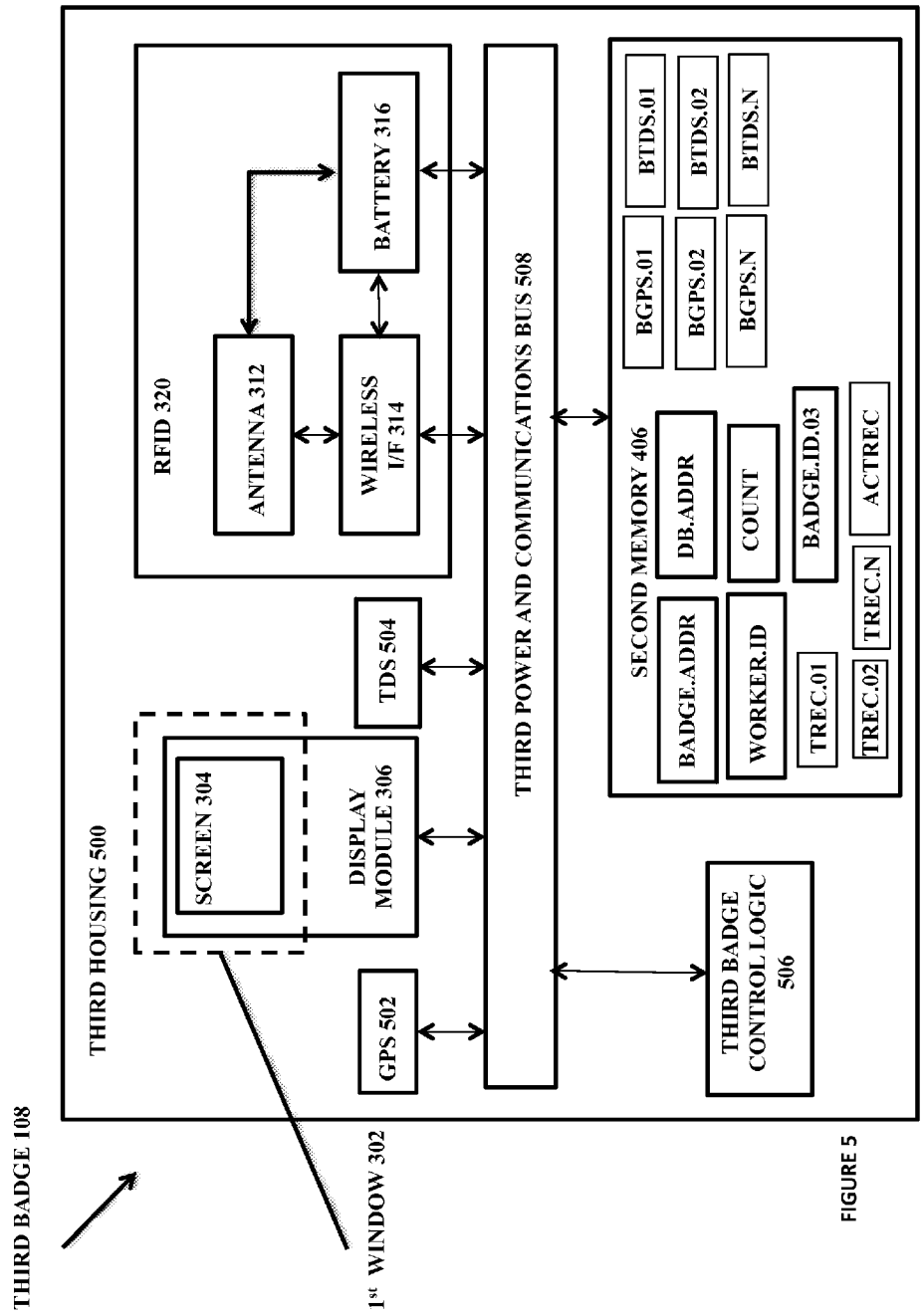
FIG. 5 is a schematic diagram of a third invented badge.

A second power and communications bus 410 (hereinafter, "second bus 410") preferably bi-directionally communicatively couples the LED module 404, the second badge control logic 408, the RFID 320 and the second memory 406. The second bus 410 further distributes electrical power stored in the battery 316 to the LED module 404, the second badge control logic 408, the solid-state second memory 406, the antenna 312, and the wireless interface 314. Referring now generally to the Figures and particularly to FIG. 5, FIG. 5 is a block diagram of the third badge 108. The third badge 108 includes a third protective housing 500 that comprises the first window section 302 that allows the screen 304 to be visually discernable to the workers W.1-W.4. The third protective housing 500 is sized, shaped and adapted to contain and protect the electrical and electronic components of the third badge 108 and the signal interconnections and signal pathways of the third badge 108.

The third badge 108 further includes the display module 306, the RFID module 320, the second memory 406, a global positioning system receiver 502 (hereinafter, "badge GPS 502"), a time date stamp data generator 504 (hereinafter, "badge TDS 504"), a third badge control logic 506 and a third power and communications bus 508 (hereinafter, "third bus 508"). The third badge control logic 506 is adapted to direct the first badge to bi-directionally communicate with the badge reader 114, to increment, decrement or reset a work unit count value COUNT, to direct the LED module 404 to display a visual representation of the count value COUNT, the second badge identifier BADGE.ID.02, to generate temporary records TREC.01-TREC.N that may include geolocational data BGPS.01-BGPS.N generated by the badge GPS 502 and/or time-date data BTDS.01-BTDS.N optionally in association with count values COUNT and/or the worker identifier WORKER.ID, and/or to instantiate or perform additional aspects of the invented method as disclosed in the present disclosure.

The third bus 508 preferably bi-directionally communicatively couples the GPS 502, the TDS 504, the display module 306, the third badge control logic 506, the RFID 320 and the second memory 406. The third bus 508 further distributes electrical power stored in the battery 316 to the badge GPS 502, the badge TDS 504, the display module 306, the third badge control logic 506, the RFID 320 and the second memory 406.

Figure 6A:
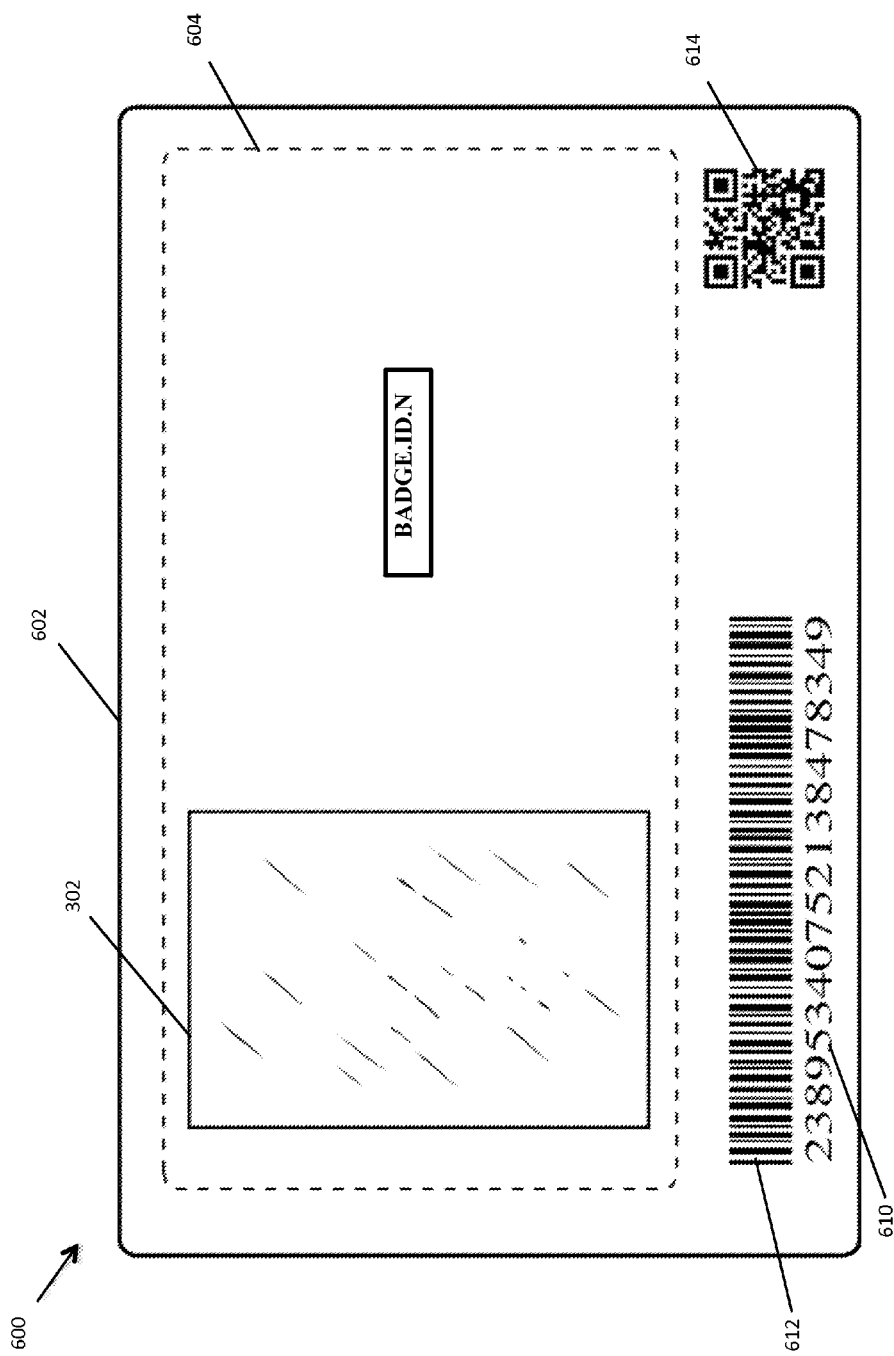
FIG. 6A is a front view of a fourth invented badge.

Referring now generally to the Figures and particularly to FIG. 6A, FIG. 6A is a front view of an exemplary fourth badge 109 that includes the display screen 304 and a fourth housing 600 having a first translucent window 302 and a protective case 602. Preferably each housing 300, 400, 500 & 600 substantially encompasses and protects an electronics module 604.

The electronics module 604 that comprises the display screen 304 is attached to or integrated with or within a substrate 606. The electronics module 604 may comprise some or all of the elements 306-320 of the first badge 104, elements 402-408 of the second badge 106, and/or elements 502-506 of the third badge 108. The substrate 606 is attached to the fourth housing 600 by an adhesive 608, as presented in FIG. 6B.

The fourth housing 600 presents an exemplary badge serial number BADGE.ID encoded into a badge alphanumeric serial number 610, a badge bar code pattern 612 and a badge QR code pattern 614 that are each preferably visible to the healthy human eye and detectable by a digital camera 615 of the badge reader 114. The badge serial number 610, the badge bar code 612 and the badge QR code 614 are also preferably detectable and readable by a digital camera of the cellular telephone 110, wherein the cellular telephone may preferably comprises a software application that interprets and decodes bar codes and/or QR codes. For example, the cellular telephone 110 may be or comprise a bundled software and hardware smartphone, such as an iPhone 4S™ touch screen-based smartphone developed and marketed by Apple Inc. of Cupertino, Calif. and further comprising bar code and/or QR code pattern recognition software and a web browser software.

Figure 6B:
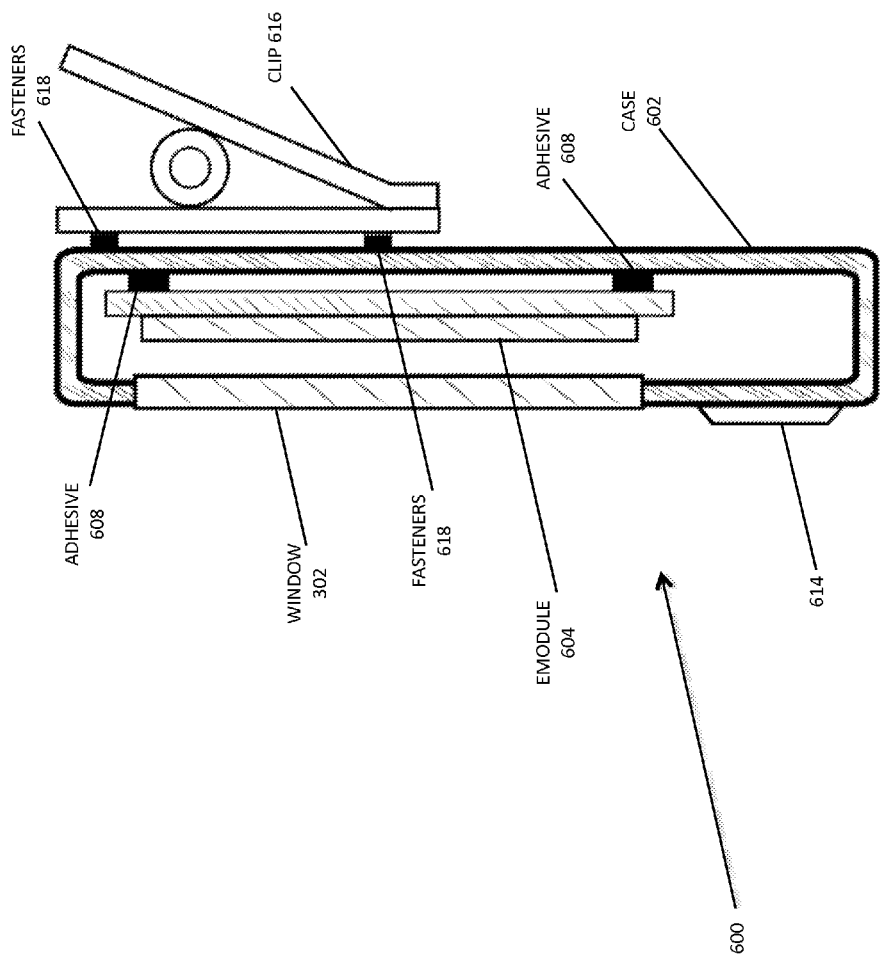
FIG. 6B is a cut-away side view of the fourth invented badge of FIG. 6A.

Referring now generally to the Figures and particularly to FIG. 6B, FIG. 6B is a cutaway side view of the fourth badge 109 and showing the electronics module 604 attached to the substrate 606 by the adhesive 608. A spring-loaded clip 616 is attached to the fourth housing 600 by fasteners 618 and/or additional adhesive (not shown).

Figure 6C:
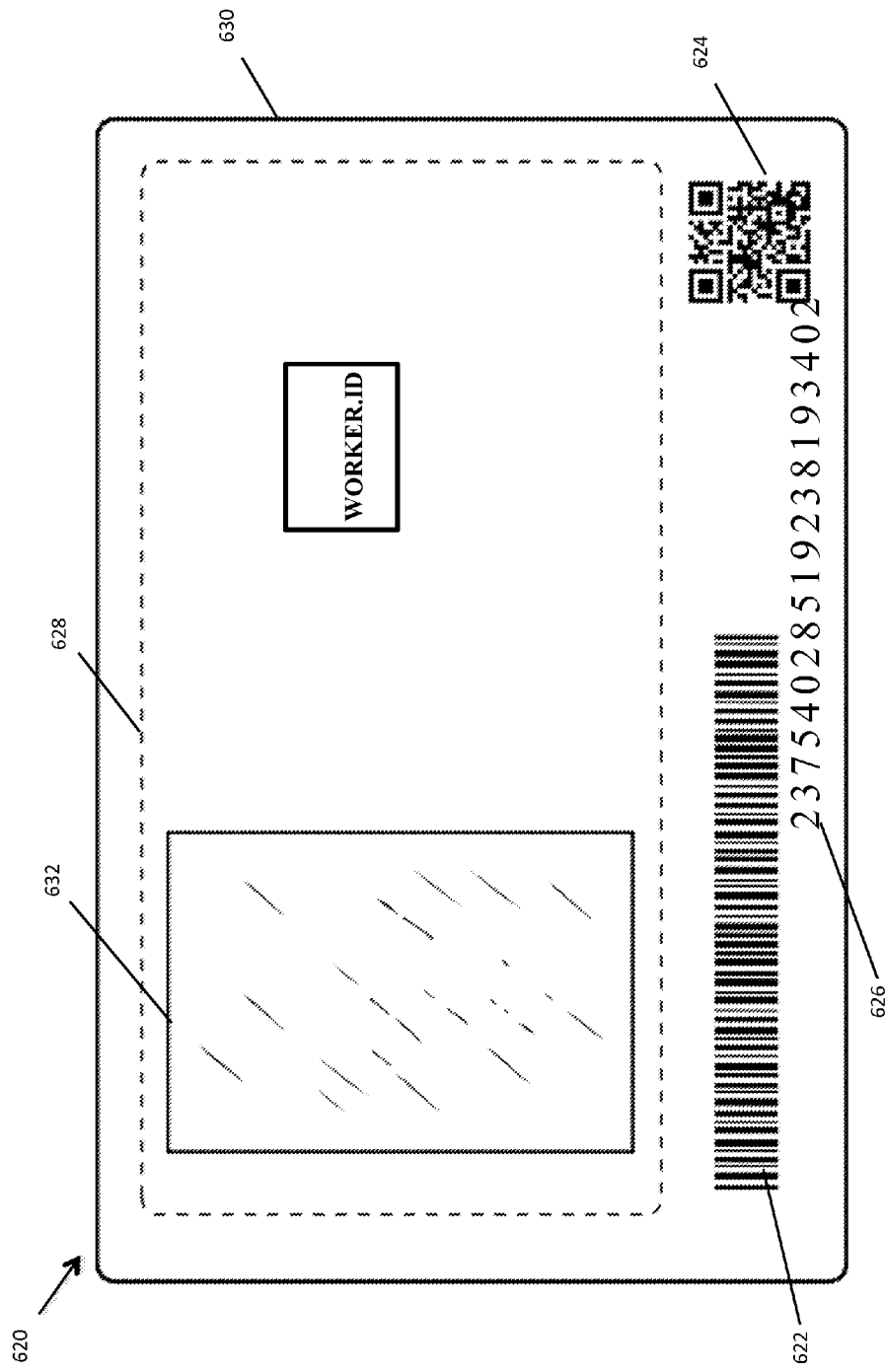
FIG. 6C is a front view of an identity card.

Referring now generally to the Figures and particularly to FIG. 6C, FIG. 6C is a front view of an exemplary identity badge 620 badge that includes an exemplary worker identifier WORKER.ID that is encoded into a worker ID bar code pattern 622, a worker ID QR code pattern 624, an alphanumeric worker serial number imprint 626, and/or stored in a worker identity RFID device 628, wherein each visible pattern 622, 624 & 626 is preferably visible to the healthy human eye and detectable by the digital camera 702 of the badge reader 114 and the cellular telephone 110. An identity card case 630 the optional worker identity RFID device 628 and an optional worker facial photograph 632.

Referring now generally to the Figures and particularly to FIGS. 6D and 6E, of a fifth alternate version 634 of the invented device (hereinafter, "strapped device 634"), that comprises a strap assembly 636 mounted to a fifth housing 638 by fasteners 640 of the strap assembly 636. The fifth housing 638 includes a strapped translucent window 642 and a protective case 644. The electronics module 604 comprises the display screen 304 and is attached to or integrated with or within the substrate 606 (not shown). The display screen 304 and the strapped translucent window 642 are positioned so that the display screen 304 is externally visible to the healthy human eye when the electronics module 604 is positioned within the fifth housing 638. The substrate 606 is attached to the fifth housing 638 by the adhesive 608 (not shown). The fifth housing 638 optionally presents an exemplary badge serial number BADGE.ID stored within the electronics module 604 and/or encoded into the badge alphanumeric serial number 610, the badge bar code pattern 612 and/or the badge QR code pattern 614 that are each preferably visible to the healthy human eye and detectable by a digital camera 615 of the badge reader 114. The badge serial number 610, the badge bar code 612 and the badge QR code 614 are also preferably detectable and readable by a digital camera of the cellular telephone 110.

The strap assembly 636 includes the fasteners 640 and two separate straps 636A & 636B. The first strap 636A includes a first hook and fastener 642A strip that detachably couples with a second hook and loop fastener strip 642B of the second strap 636B. The hook and loop fastener strips 642A & 642B are selected and positioned to enable detachable coupling of the straps 636A & 636B. The housing includes receivers (not shown) that accept the fasteners 640 to enable separate coupling of each strap 636A & 626B. The straps 636A & 636B may be sized and shaped to enable detachable coupling of the straps 636A & 636B around a human limb, e.g., a wrist or an arm.

Figure 7:
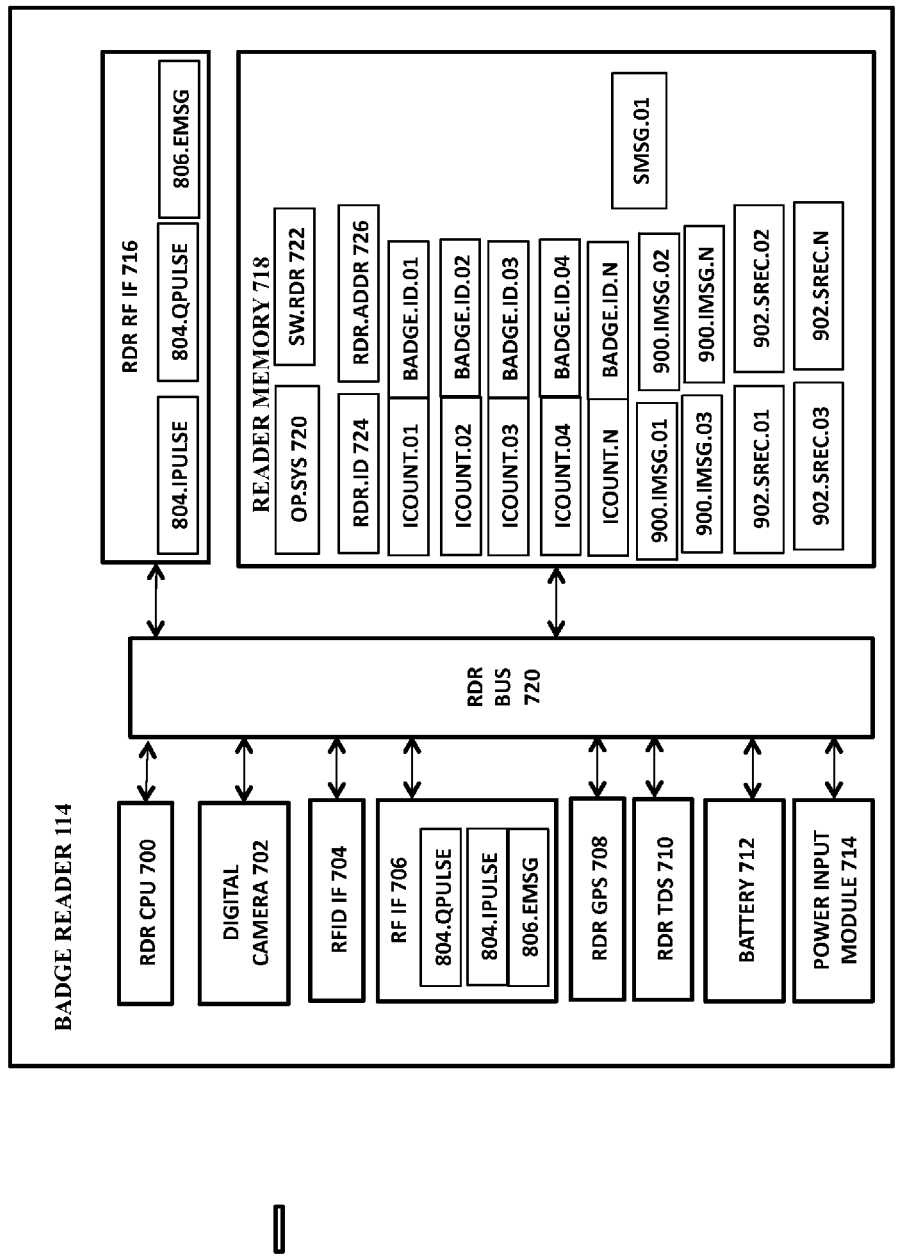
FIG. 7 is a block diagram of a badge reader of FIG. 2.

Referring now generally to the Figures and particularly to FIG. 7, FIG. 7 is a block diagram of electrical and electronic components, interconnections and signal pathways of the badge reader 114. The badge reader 114 preferably includes a reader central processing unit 700 (hereinafter, "RDR CPU 700"), a digital camera module 702 housing the digital camera 615, a reader RFID interface 704 that is adapted to transit information and electrical energy to the RFID module 320, a bi-directional radio wave communications interface 706 (hereinafter, "RF IF 706"), a reader global positioning receiver 708 (hereinafter, "RDR GPS 708"), a reader date-time data generator 710 (hereinafter, "RDR TDS 710"), an electrical energy battery 712, an electrical power input module 714 that is adapted to receive electrical energy from an external source, a reader bi-directional wireless radio frequency communications interface 716 (hereinafter, "RDR RF IF 716") and a reader memory 718. The RDR RF IF 716 bi-directionally communicatively couples the badge reader 114 with the internet 1202, the portable server 116 and/or the first wireless server 118.

It is understood that the badge reader 114 may be or comprise a commercial available RFID reader, such as a 70 Series Ultra-Rugged Mobile Computer™ RFID reader device marketed by the Intermec Corporation of Everett, Wash.; an IP30™ handheld RFID reader marketed by the Intermec Corporation of Everett, Wash.; a MC3190-Z™ handheld RFID reader as marketed by Motorola Solutions, Inc. of Schaumberg, Ill.; a MC9190-Z™ handheld RFID reader as marketed by Motorola Solutions, Inc. of Schaumberg, Ill.; a FX7400™ fixed RFID reader as marketed by Motorola Solutions, Inc. of Schaumberg, Ill.; a FX9500™ fixed RFID reader as marketed by Motorola Solutions, Inc. of Schaumberg, Ill.; a DS9808-R™ bar code scanner and RFID reader as marketed by Motorola Solutions, Inc. of Schaumberg, Ill.; and/or or more suitable RFID reader, bar code readers and/or QR code readers in singularity or in combination.

A reader power and communications bus 720 (hereinafter, "RDR BUS 720") of the badge reader 114 preferably bi-directionally communicatively couples the RDR CPU 700, the digital camera module 702, the reader RFID interface 706, the RDR GPS 708, the RDR TDS 710, the electrical power input module 714, the RDR RF IF 716 and the reader memory 718. The digital camera 702 is adapted and configured to detect bar code images and QR images. The RF IF 706 is adapted and configured to preferably bi-directionally communicate with one or more badges 104-109 and/or the cellular telephone 110.

The reader memory 718 stores a reader operating system OP.SYS 720, a reader system software SW.RDR 722, a reader identifier RDR.ID 724, a reader network address RDR.ADDR.01 726 and one or more of a plurality of session records SREC.01-SREC.N. The reader system software SW.RDR 722 directs the reader CPU 700 to perform or instantiate aspects of the invented method as disclosed in the present invention.

Figure 8:
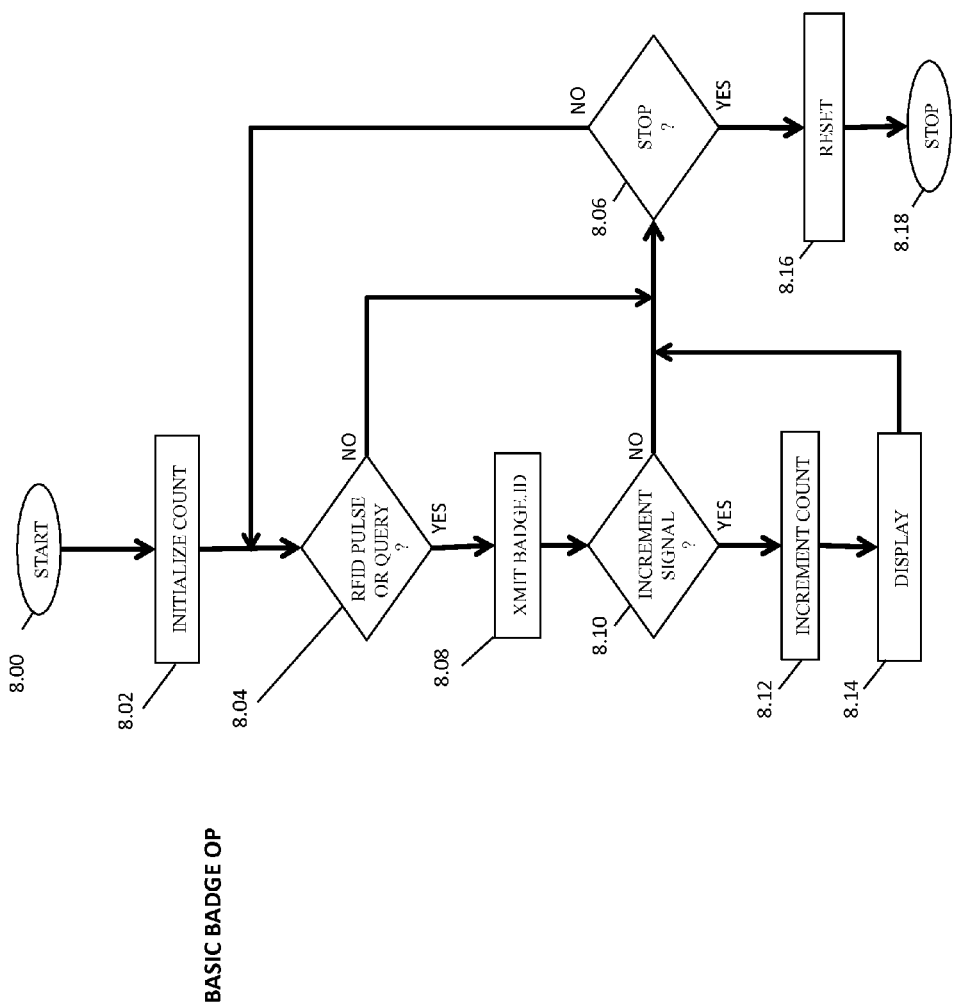
FIG. 8 is a flowchart of a basic operation of a badge of FIGS. 3 through 6B.

Referring now generally to the Figures and particularly to FIG. 8, FIG. 8 is a software flowchart of a first preferred embodiment of certain aspects of the present invention. The discussion of FIG. 8 will refer to an exemplary interaction of the first badge 104 with the badge reader 114, and it is understood that one or more aspects of the method of FIG. 8 may be applied by various embodiments of additional embodiments of the invented badges 106-110.

In step 8.00 the first badge 104 powers up, possibly in response to a receipt of a query pulse 800.QPULSE transmitted from the badge reader 114 and optionally accompanied by or comprised within an energy transference pulse sent from the badge reader 114. In step 8.02 the first badge 104 preferably transmits a first badge identifier message 802.IDMSG.01 by radio frequency transmission via the antenna 312 of the first badge 114, wherein the first badge identifier message 802.IDMSG.01 contains the first badge identifier BADGE.ID.01.

The first badge 114 then determines in step 8.04 if a value count incrementing pulse message 804.IPULSE has been received, and if no pulse message receipt is detected proceeds on to step 8.06 to determine whether to cease receiving value count incrementing pulse messages 804.IPULSE or to return to await another execution of step 8.00. It is understood that a wait step may be imposed (a.) between step 8.04 and step 8.06 and/or (b.) between step 8.06 and step 8.00.

When the first badge 104 detects an incrementing count value pulse 804.IPULSE in step 8.04, the first badge 104 increments the count value COUNT stored in the first memory 310 and/or the register 322 in step 8.08. It is understood that the detected incremental pulses (a.) received through the antenna 312 and/or the RFID module 320, (b.) preferably emitted by the badge reader; and (c.) may be accompanied by or incorporated within an energy transference pulse sent from the badge reader 114.

The first badge 104 proceeds from step 8.08 to step 8.10 and visually renders the count value COUNT in the display screen 304 and optionally transmits an exemplary first badge increment report 802.IMSG message to the badge reader 114 and/or the network 2 via the antenna 312. The first badge increment report message 802.IMSG includes at least the first badge identifier BADGE.ID.01 and the current count value COUNT.

The badge 104 proceeds from step 8.12 to step 8.06 and to determine whether to proceed to step 8.00 to optional step 8.16 and therein to reset the count value COUNT to the null value.

It is understood that the determination by the first badge 104 of step 8.06 may be directed by receipt by the first badge 114 of an exemplary badge end session message 806.EMSG transmitted from the badge reader 114, whereby the badge reader 114 directs the first badge 114 to proceed from step 8.06 to step 8.16 or step 8.18. It is further understood that the first badge control logic 308 is adapted, programmed and/or configured to enable the operations of the first badge 114 as disclosed in the present disclosure.

Figure 9A:
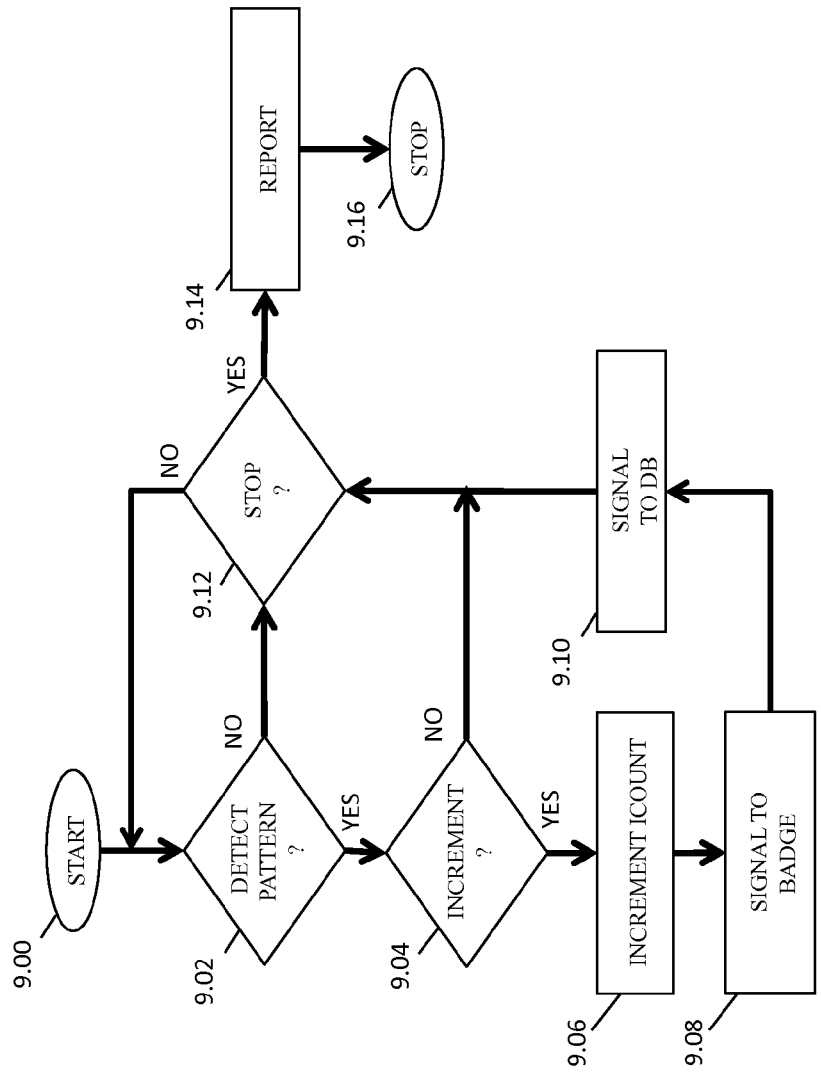
FIG. 9A is a flowchart of basic aspects of the badge reader of FIGS. 2 and 7.

Referring now generally to the Figures and particularly to FIG. 9A, FIG. 9A is a software flowchart of a first preferred embodiment of certain aspects of the present invention as performed by the badge reader 114. It is further understood that the reader RDR CPU 700 and/or the reader system software SW.RDR 722 are adapted, programmed and/or configured individually or in combination to enable the operations of the badge reader 114 as disclosed in the present disclosure.

The badge reader 114 is powered on in step 9.00 and attempts to determine if a pattern comprising a badge identifier BADGE.ID.01-BADGE.N is detected. The example of a detecting of the exemplary first badge identifier will be discussed regarding the process of steps 9.02 through 9.14, but it is understood that the process of FIG. 9 is preferably applicable to the other invented badges 106-109 and/or the cellular telephone 110.

In certain alternate preferred embodiments of the invented method, the badge identifier BADGE.ID.01-BADGE.ID.N may be detected by the badge reader 114 from (a.) a radio transmission of a badge identifier message 802.IDMSG.01-802.IDMSG.N by a badge 104-109 sent in response to an RFID energy pulse message 800.QPULSE issued by the badge reader 114; and/or (b.) in an interpretation of the serial number 610, bar code pattern image 612 and/or QR code pattern image 614 of the fourth badge 109. The badge reader 114 determines in step 9.04 whether to send an incrementing pulse 804.IPULSE to the badge 104-109 detected in step 9.02. It is understood that the incrementing pulse message 804.IPULSE may optionally include the badge identifier BADGE.ID.01-BADGE.ID.N detected in step 9.02. The decision of step 9.04 may be driven by a human operator of the badge reader 114 or may be accomplished in accordance with the programmed or configured instructions of the reader RDR CPU 700 and/or the reader system software SW.RDR 722. The badge reader 114 increments an internal count value ICOUNT.01-ICOUNT.N of the badge reader 114 that is associated with the badge identifier BADGE.01-BADGE.N detected in step 9.02 and then transmits an incrementing pulse message 804.IPULSE in step 9.08 to the detected badge 104-109 or cellular telephone 110, wherein the first internal count value ICOUNT.01 is preferably associated with the first badge 104 identified by the first badge identifier BADGE.ID.01 detected in step 9.02.

The badge reader 114 may optionally store a plurality of internal count values ICOUNT.01-ICOUNT.N that are each uniquely associated with a particular badge identifier BADGE.ID.01-BADGE.N.

The badge reader 114 may further optionally and additionally transmits an incrementing record message 900.IREC.01-900.IREC.N to the DB server 26 in step 9.08. The incrementing record message 900.IREC.01-900.IREC.N preferably includes the badge identifier BADGE.ID.01-BADGE.ID.N detected in step 9.02 and an associated internal count value ICOUNT.01-ICOUNT.N.

The badge reader 114 determines in step 9.12 whether to return another execution of step 9.02 or to proceed on to step 9.14 and to issue and transmit (a.) one or more end session messages 806.EMSG to badges 104-110 and/or (b.) one or more end session records 902.SREC.01-902.SREC.N to the DB system 206. The badge reader 114 proceeds from step 9.14 to step 9.16 and to perform alternate computational processes.

Figure 9B:
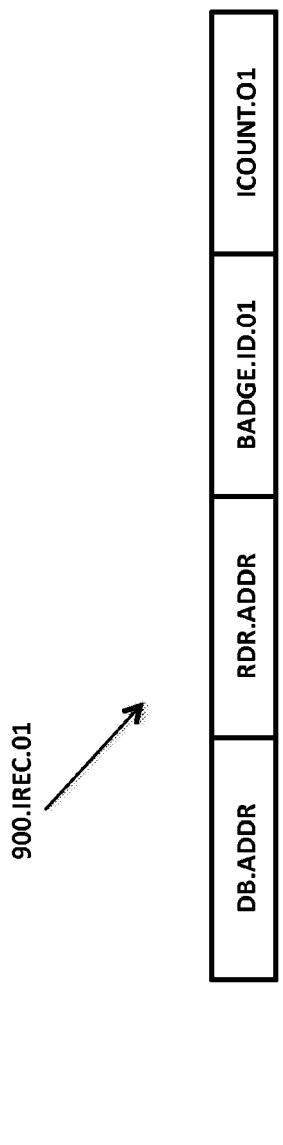
FIG. 9B is a block diagram of an increment message as transmitted from the badge reader of FIGS. 2 and 7 to the database server of FIG. 2.

Referring now to FIG. 9B, an exemplary first incrementing pulse message 900.IREC.01 includes at least the DB server network address DB.ADDR as a destination address, a sender network address of the reader network address RDR.ADDR and/or a network address of the portable server 116 (not shown) or the first wireless sever 118 (not shown), the first badge identifier BADGE.ID.01, and the first internal count value ICOUNT that is associated with the first badge identifier BADGE.ID.01 by the badge reader 114.

Figure 9C:
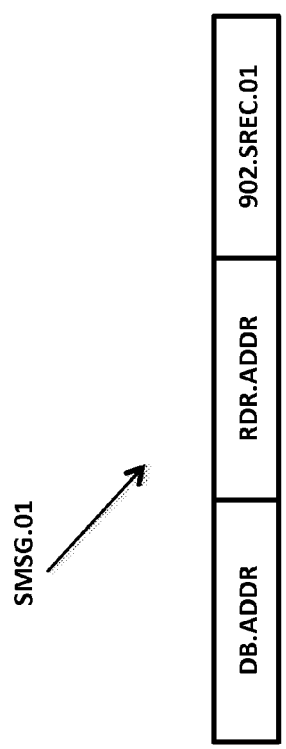
FIG. 9C is a block diagram of a session record as transmitted from the badge reader of FIGS. 2 and 7 to the database server of FIG. 2.

Referring now to FIG. 9C, a first exemplary session message SMSG.01 comprises an exemplary first session record 902.SREC.01. The first session message SMSG.01 is preferably generated by the badge reader 114, the portable system 116 server 116 and/or the first wireless server 118. The first session report SREP.01 further includes at least the DB server network address DB.ADDR as a destination address, a sender network address of the reader network address RDR.ADDR and/or a network address of the portable server 116 (not shown) or the first wireless sever 118 (not shown), the first badge identifier BADGE.ID.01, and the exemplary first session record 902.SREC.01 that is associated with the first badge identifier BADGE.ID.01 by the badge reader 114.

Referring now generally to the Figures and particularly to FIG. 10A, FIG. 10A is a flowchart of advanced optional operations of the second badge 106, the third badge 108 and/or the cellular telephone 110. The following discussion of the aspects of the process of FIG. 10A will follow an illustrative example of the third badge 108 interacting with the badge reader 114 and optionally the network 2 and is not meant to be indicate any limitations of the applications or instantiations of optional capabilities or aspects of the other badges 104-109 and cellular telephone 110. In step 10.02 the third badge 108 initializes both (a.) the count value COUNT of the third badge 108 to a null value; and (b.) the activity record ACT.REC to null values. The third badge 108 optionally receives and records a worker identifier WORKER.ID in step 10.04, wherein the worker identifier WORKER.ID uniquely identifies a particular worker W.1-W.4. The worker identifier WORKER.ID may be input to the second memory 406 via the RFID 320 and/or the antenna 312.

The third badge 108 determines in step 10.06 whether a query pulse 804.QPULSE has been received from the badge reader 108, and if so transmits the second badge identifier BADGE.ID.02 to the badge reader 114 in step 10.08. The third badge 108 determines in step 10.10 whether an increment pulse 804.IPULSE has been received from the badge reader 108, and if so increments the count value COUNT stored in the third badge 108 and visually renders and in step 10.14 displays the newly incremented count value COUNT in the display screen 304, or optionally the LED 404 in the case of the second badge 106.

The third badge 108 proceeds from step 10.14 to step 10.16 and to transmit the activity record ACT.REC to the badge reader 114, wherein the activity reader ACT.REC may present a plurality of badge GPS values BGPS.01-BGPS.N and badge time date values BTDS.01-BTDS.N. The determination of the third badge 108 to proceed from step 10.20 to step 10.22 may be affected by receipt by the third badge 108 of an exemplary badge end session message 806.EMSG transmitted from the badge reader 114.

The third badge 108 resets the activity record ACT.REC to null values in step 10.18 and then determines in step 10.20 whether to return to step 10.06 or to proceed to step 10.22. The third badge 108 optionally reports an end of a work session to the badge reader 114 in step 10.22. The badge reader 114 resets the count value COUNT of the third badge 108 to a null value and optionally the worker identifier WORKER.ID to a null value in step 10.24.

In an alternate pathway from step 10.06 to step 10.22, the third badge 108 adds data in step 10.28 to the activity record ACT.REC an additional badge GPS data generated by the badge GPS 502 and an additional badge TDS data as contemporaneously generated by the badge TDS 504, whereby positions and times of the third worker W.3 are periodically recorded and stored in the activity record ACT.REC.

Referring now generally to the Figures and particularly to FIG. 10B, FIG. 10B is a block representation of an activity record ACT.REC and the third badge record identifier BADGE.ID.03 that may be transmitted in combination from the third badge 108 to the badge reader 114 in step 10.16 of the process of FIG. 10A.

Referring now generally to the Figures and particularly to FIG. 10C, FIG. 10C is a block representation of information that may be transmitted from the third badge BADGE.ID.03 to the badge reader 114 in step 10.22 of the process of FIG. 10A. The information transmitted in step 10.22 may include data stored in the third badge 108, to include the third badge identifier BADGE.ID.03, the worker identifier WORKER.ID, the current count value COUNT, a third badge network address B3.ADDR associated with the third badge 108 within the network 2, and the database system network address DB.ADDR associated with the DB server 206.

Figure 11A:
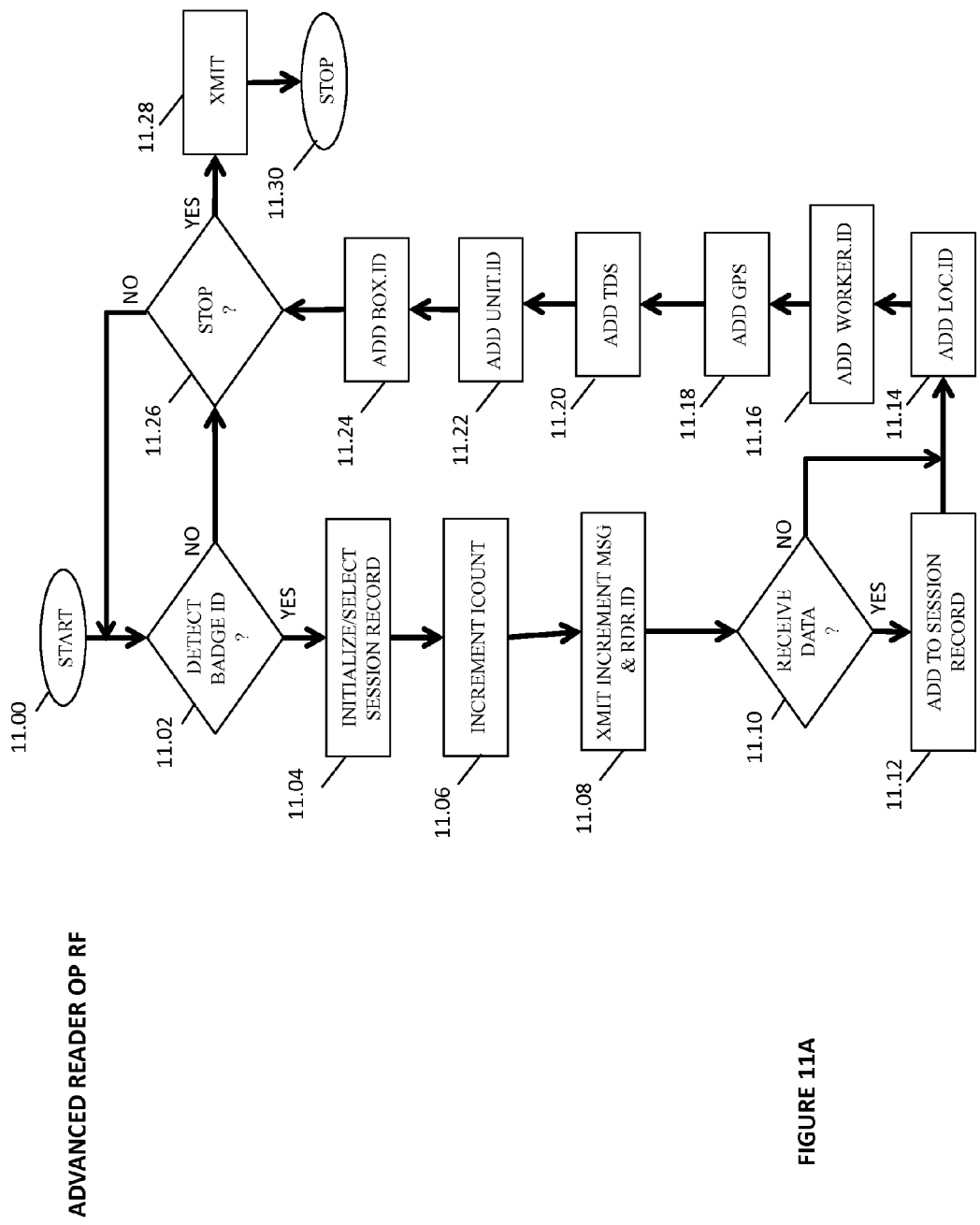
FIG. 11A is a flowchart of advanced aspects of the invented method as affected by the badge reader of FIGS. 2 and 7.

Referring now generally to the Figures and particularly FIG. 11A, FIG. 11A is an illustration of additional and optional aspects of the invented method. When the badge reader 114 detects a badge identifier BADGE.ID.01-BADGE.ID.N, either as transmitted by radio frequency transmission from a badge 104-109 or the cellular telephone 110 or by detection from a visual bar code pattern, QR code pattern or a serial number. In step 11.04 the badge reader 114 selects an existing session record SREC.01-SREC.N that relates to the badge identifier BADGE.ID.01-BADGE.ID.N detected in step 11.02, or initializes a new session record SREC.01-SREC.N. The badge reader then increments the internal value count ICOUNT.01-ICOUNT.N associated with the badge identifier BADGE.ID.01-BADGE.ID.N detected in step 11.02. The badge reader 114 transmits an increment pulse 804.IPULSE to the detected badge 114-109 or cellular telephone 110, and optionally transmits the reader identifier RDR.ID. When the badge reader 114 determines in step 11.10 that a badge 104-109 or cellular telephone 110 has transmitted information, such as a badge identifier BADGE.ID.01-BADGE.ID.N, the badge reader 114 adds the received information to the session record SREC.01-SREC.N associated with a same badge 104-09 or cellular telephone 110. It is understood that the data received in step 11.10 may include the activity record ACT.REC of the third badge 108. The badge reader 114 may optionally add further data into the session record SREC.01-SREC.N, to include the location identifier LOC.ID, the worker identifier WORKER.ID, a GPS data generated by the RDR GPS 708, a time data stamp generated by the RDR TDS 710, a unit identifier UNIT.ID and/or a box identifier BOX.ID. The unit identifier UNIT.ID may be read as transmitted by radio frequency transmission from a unit badge 1100A-1100N or by detection from a visual bar code pattern, QR code pattern or a serial number of a unit badge 1100A-1100N. The box identifier BOX.ID may be read as transmitted by radio frequency transmission from a box badge 1102 or by detection from a visual bar code pattern, QR code pattern or a serial number of the box badge 1102. The badge reader 114 proceeds from step 11.26 to either (a.) step 11.02; or (b.) step 11.28 and to transmit a session record SREC.01-SREC.N to the DB server 206 in step 11.28.

Figure 11B:
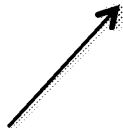
FIG. 11B is a block diagram of an alternate session record as transmitted from the third badge reader of FIG. 5 to the database server of FIG. 2.

Referring now generally to the Figures and particularly to FIG. 11B, an exemplary first session record SREC.01 transmitted in step 11.28 to the database server network address DB.ADDR of the DB server 206. The first session record SREC.01 includes a first session record identifier SREC.ID.01, the reader identifier RDR.ID, a worker identifier WORKER.ID, a time date datum TDS, a GPS datum GPS, one or more box identifiers BOX.ID, one or more unit identifiers UNIT.ID.01-UNIT.ID.N, the local identifier LOC.ID. And optionally a plurality of activity records ACT.REC as received from a same badge 104-109 or the cellular telephone 110.

Figure 11C:
FIG. 11C is a block diagram of a session message as transmitted from the third badge reader of FIG. 5 to the badge reader of FIGS. 2 and 7 and/or the database server of FIG. 2.

Referring now generally to the Figures and particularly to FIG. 11C, FIG. 11C is a block diagram of an exemplary second session message SMSG.02. The second session message SMSG.02 further includes at least the DB server network address DB.ADDR as a destination address, a sender network address of the reader network address RDR.ADDR and/or a network address of the portable server 116 (not shown) or the first wireless sever 118 (not shown) and the exemplary first session record SREC.01.

Figure 12:
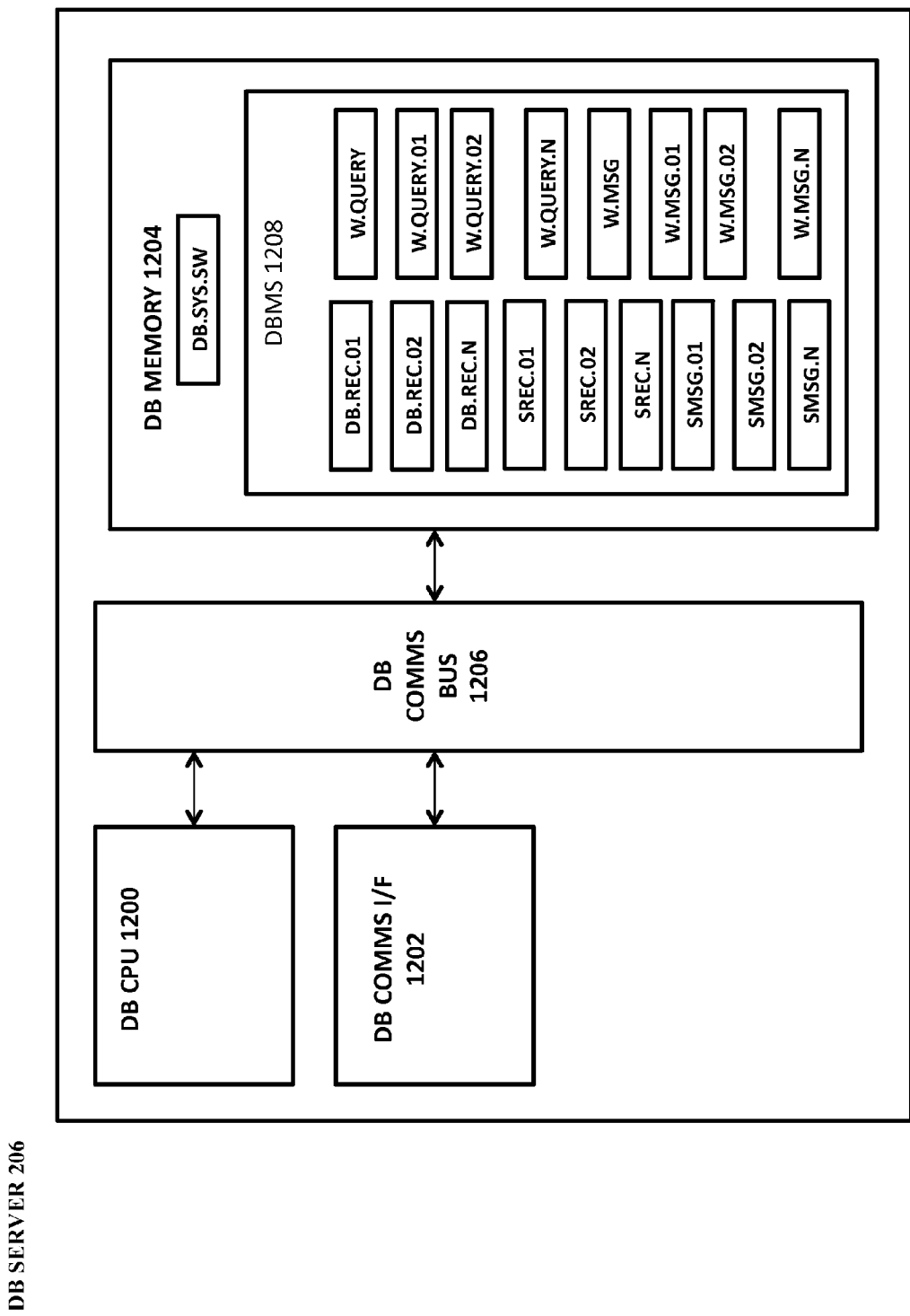
FIG. 12 is a block diagram of the database server of FIG. 2.

Referring now generally to the Figures and particularly to FIG. 12, FIG. 12 is a schematic diagram of the DB server 206 and showing the DB server 206 includes a database central processing unit 1200, a database communications interface 1202 and a database memory 1204 that are all preferably bi-directionally communicatively coupled by an internal database communications bus 1206. A database system software DB.SYS.SW stored in the database memory 1204 enables the DB server 206 to instantiate or execute certain aspects of the invented method as disclosed herein. The database communications interface 1202 bi-directionally communicatively couples the DB server 206 with the internet 1202. A database management system 1208 stored in the database memory 1204 maintains database records DB.REC.01-DB.REC.N in which information harvested from session messages SMSG.01-SMSG.N, session records SREC 0.01-SREC.N.

Figure 13:
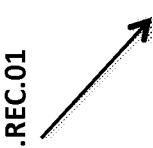
FIG. 13 is a block diagram of database record of the database server of FIGS. 2 and 12.

Referring now generally to the Figures and particularly to FIG. 13, an exemplary first database record DB.REC.01 stored in the DB server 206. The first database record DB.REC.01 includes a first database record identifier DB.REC.ID.01, the reader identifier RDR.ID, the worker identifier WORKER.ID, an earliest time date datum TDS.01, a earliest recorded GPS datum GPS, a latest time date datum TDS.01, a latest recorded GPS datum GPS, one or more box identifiers BOX.ID, one or more unit identifiers UNIT.ID.01-UNIT.ID.N, the local identifier LOC.ID, optionally a plurality of activity records ACT.REC as received from a same badge 104-109 or the cellular telephone 110, and a password PASS.

Figure 14A:
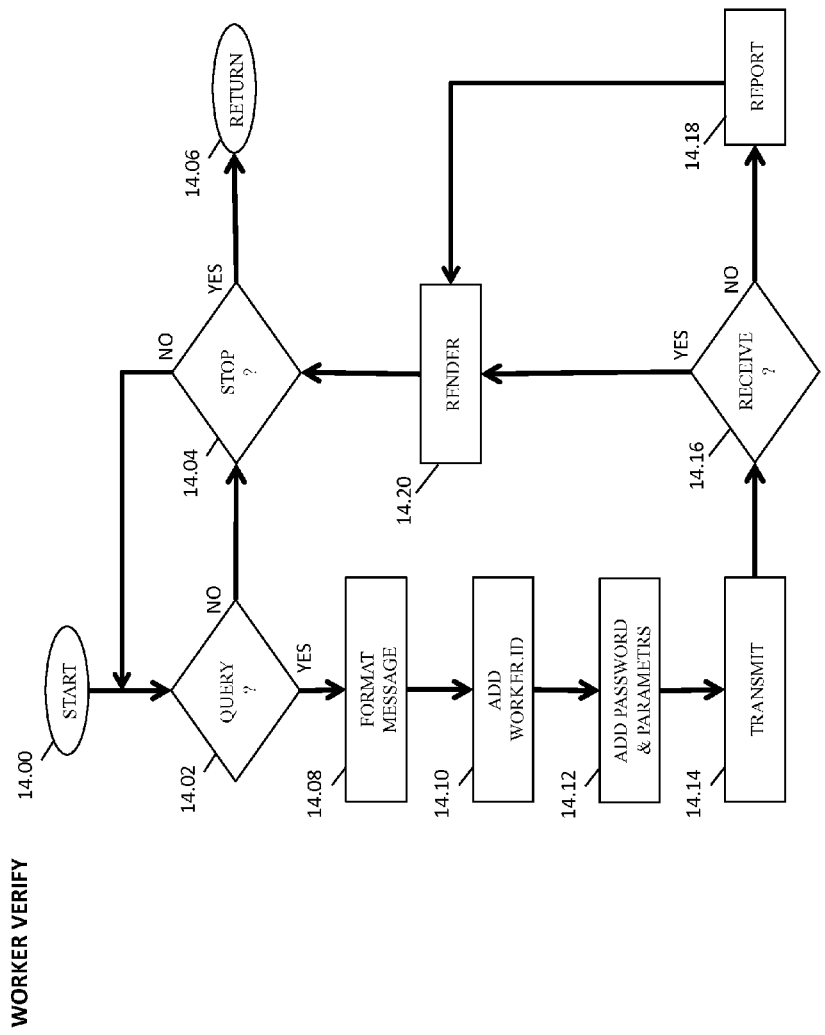
FIG. 14A is flowchart that enables worker verification of a recordation of accomplished and credited piecework by a worker, wherein the verification that is instantiated by the cellular telephone or the client system of FIG. 2 via the network of FIG. 2.

Referring now generally to the Figures and particularly to FIG. 14A, FIG. 14A is a flowchart that may be instantiated by the cellular telephone 110 or the client system 212 in querying the DB server 206, whereby a worker W.1-W.4 may confirm a recordation of piece work tabulation, such as value counts COUNT recorded on various days at various work sites. In step 14.02 a query system, i.e., the cellular telephone 110 or the client system 212, determines if a worker W.1-W.4 has directed the query system 110 & 212 to generate a query message that will be applied in a database search query by the DB server 206. When the query system 110 & 212 determines in step 14.02 that a worker W.1-W.4 has not directed the query system 110 & 212 to generate a message that will query the DB server 206, the query system 110 & 212 proceeds to step 14.04 and then determines whether to proceed of step 14.06 and perform alternate computational operations or to return to an additional execution of step 14.02.

When the query system 110 & 212 determines that a worker W.1-W.4 has directed the query system 110 & 212 to generate a message that will query the DB server 206, the query system 110 & 212 initializes and formats an exemplary work query W.QUERY in step 14.08, adds a worker identifier WORKER.ID to the work query W.QUERY in step 14.10, optionally adds search parameters a password PASS to the work query W.QUERY in step 14.12. The search parameters might include date-time ranges, the location identifier LOC.ID, one or more badge identifiers BADGE.ID.01-BADGE.ID.N, one or more box identifiers BOX.ID, one or more unit identifiers UNIT.ID.01-UNIT.ID.N.

The query system 110 & 212 transmits the exemplary work query W.QUERY to the DB server 206 in step 14.14 and determines in step 14.16 if an exemplary search results message Q.MSG has been received. When no response search results message Q.MSG is detected in step 14.16, the query system 110 & 212 proceeds from to step 14.18 and prepares a report of the lack of receipt of a response search results message Q.MSG which is the rendered in step 14.20. In the alternative, when receipt of a response search results message Q.MSG is detected in step 14.16, the query system 110 & 212 proceeds directly to step 14.20 and renders the received response search results message Q.MSG. The query system 110 & 212 proceeds from step 14.20 to step 14.04

Figure 14B:
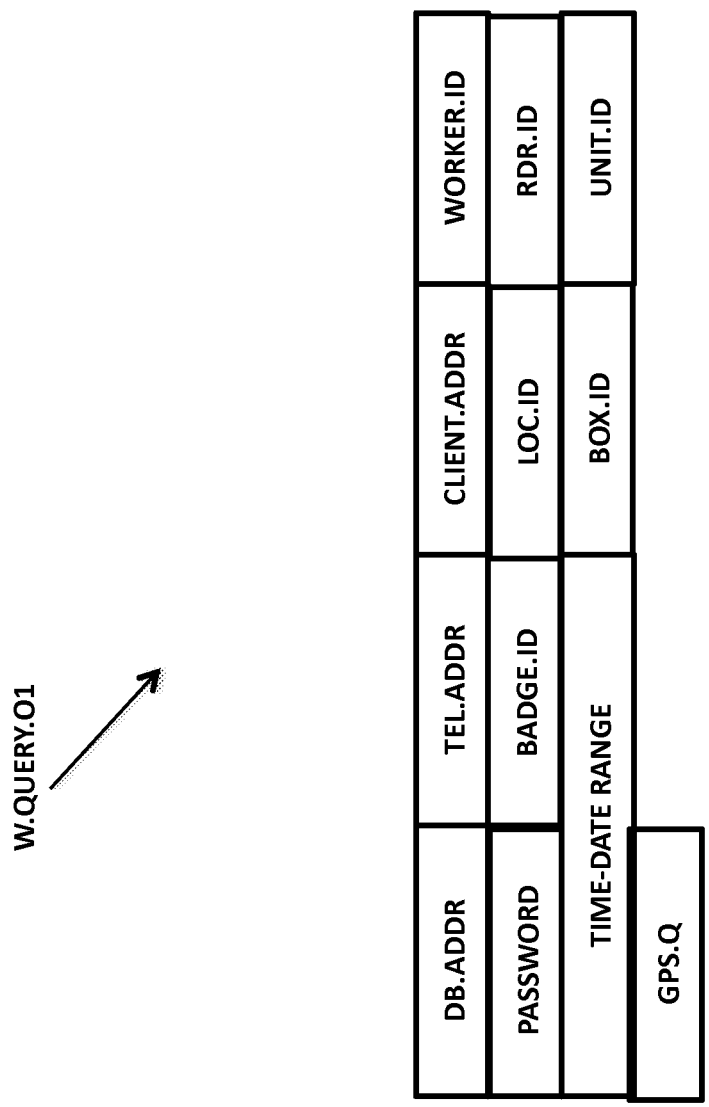
FIG. 14B is a block diagram of an exemplary query message that may be applied to the database server of FIGS. 2 and 12.

Referring now generally to the Figures and particularly to FIG. 14B, FIG. 14B is a block diagram of an exemplary first work query message W.QUERY.01 that is representative of the plurality of work query messages W.QUERY & W.QUERY.01-W.QUERY.N received by the DB server 206. The first work query message W.QUERY.01 includes the DB server network address DB.ADDR as a destination address, a telephone network address TEL.ADDR or a client network address CLIENT.ADDR of the client system 212 as a sender address. The exemplary first work query message W.QUERY.01 may include one of a number of database search parameters or filters, such as (a.) a worker identifier WORKER.ID, (b.) the password PASS, (c.) the exemplary first badge identifier BADGE.ID.01, (d.) the location identifier LOC.ID, (e.) the reader identifier RDR.ID, (f.) a time-date range, (g.) one or more box identifiers BOX.ID, (h.) one or more unit identifiers UNIT.ID; (i) one or more GPS data GPS.Q.

Figure 15:
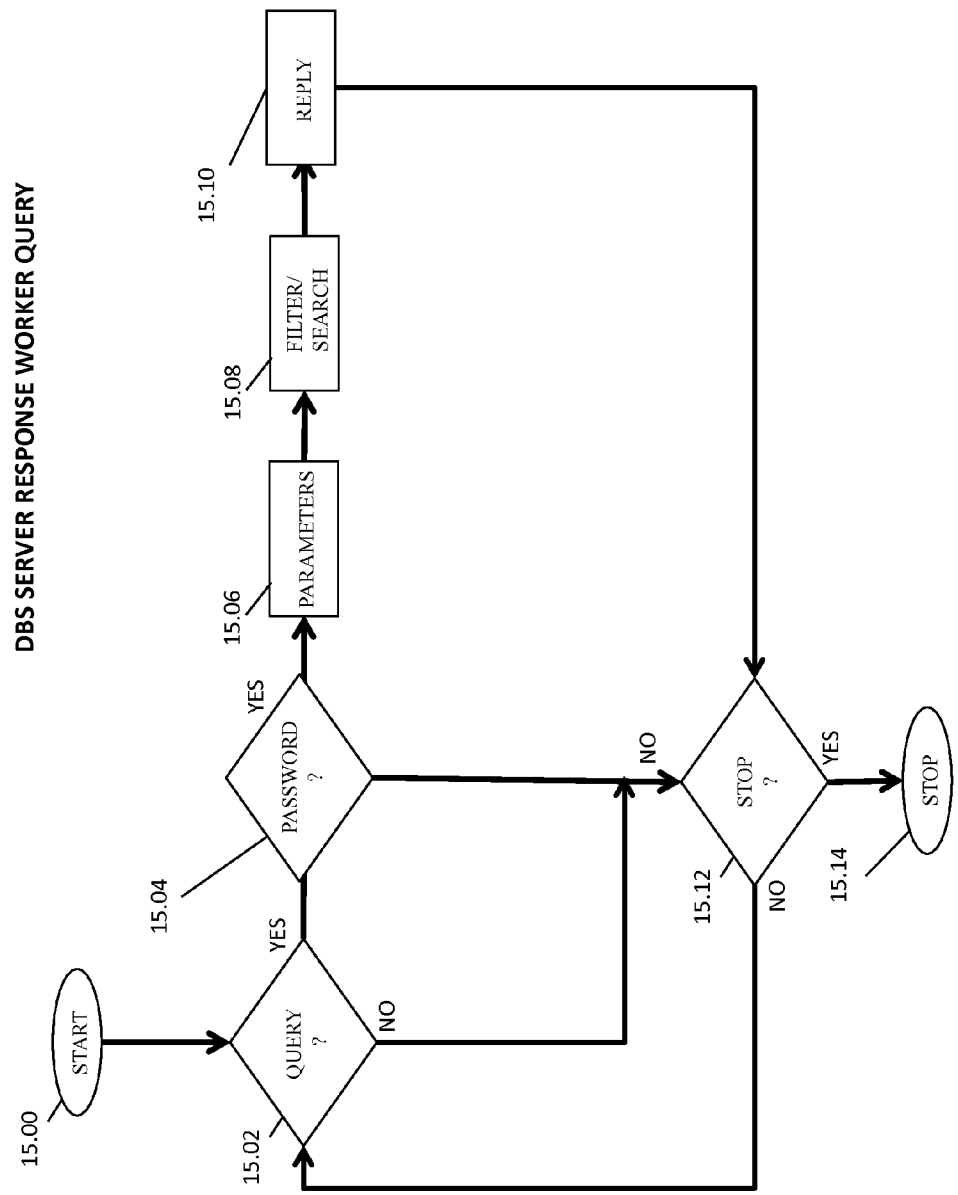
FIG. 15 is a software flowchart of an alternate processing by the database server of FIGS. 2 and 12 of the exemplary query message of FIG. 14B.

Referring now generally to the Figures and particularly to FIG. 15, FIG. 15 is a flowchart of a process of the DB server 206 in responding to a work query W.QUERY & W.QUERY.01-W.QUERY.N. The DB server 206 searches the DBMS 1208 and applies the filter parameters of a work query message W.QUERY. When a query message receipt is detected in step 15.02, the DB server 206 determines in step 15.04 if the received work query message W.QUERY includes the password PASS. When the DB server 206 detects the presence of the correct password PASS in the received work query message W.QUERY, the DB server 206 extracts the search filter parameters from the received work query message W.QUERY and performs a search of the database records in step 15.08. The results of the database search are then performed in communicated to the sending address of the received work query message W.QUERY in step 15.10.

The DB server 206 determines in step 15.12 whether to return to step 15.02 and to proceed on to step 15.14 and cease accepting database query messages.

Figure 16:
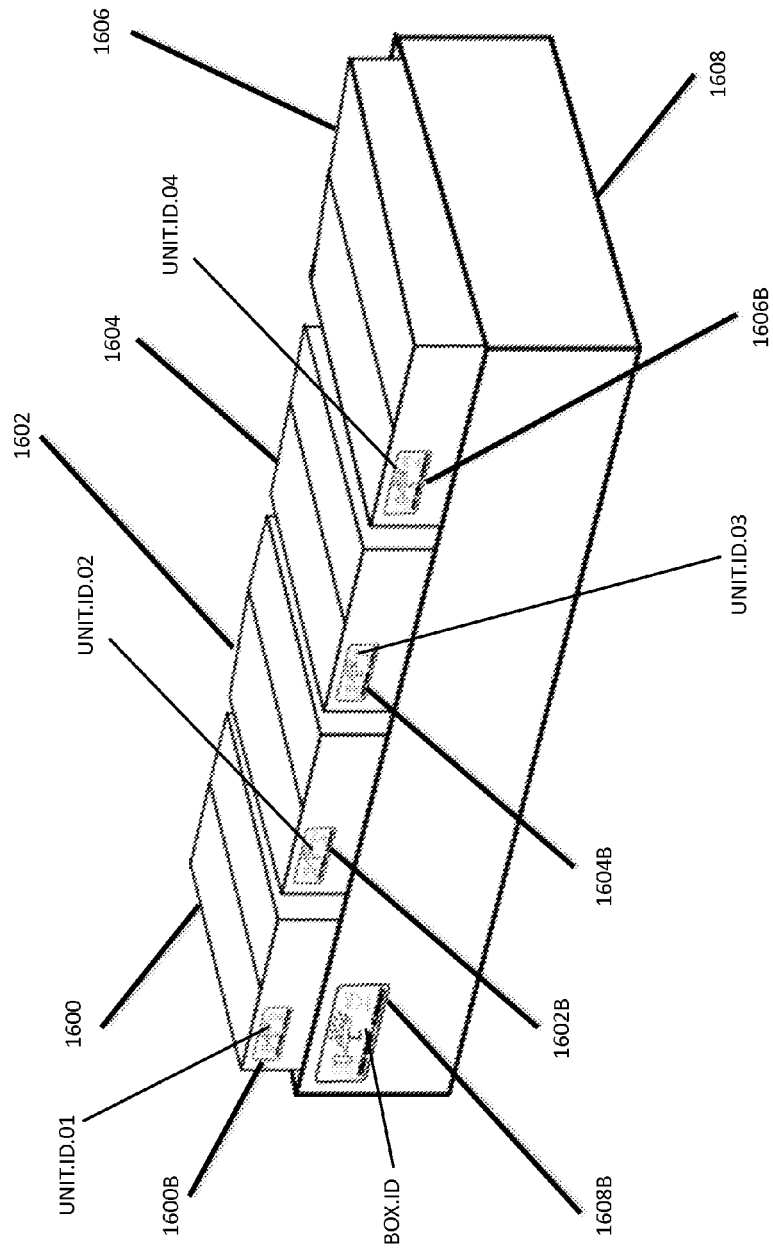
FIG. 16 is a perspective illustration of a plurality of boxes inserted into and associated with a comprising box.

Referring now generally to the Figures and particularly to FIG. 16, FIG. 16 is a perspective illustration of a plurality of units 1600-1606 that are associated with and shipped within a box 1608. A first unit 1600 has a first unit badge 1600B and each unit 1600-1606 has a dedicated unit badge 1600B-1606B, and the box 1608 has an attached box badge 1608B. The box badge 1600B and the unit badges 1600B-1606B each have unique identifiers BOX.ID & UNIT.ID.01-UNIT.ID.04 that may be stored in separate RFID modules 320 of each respective box badge 1608B and unit badges 1600B-1606B, and or presented in visible serial numbers, bar code patterns, and/or QR code patterns of their respective and dedicated badges 1600B-1608B.

While the present invention may be susceptible to various modifications and alternative forms, specific embodiments have been shown by way of example in the drawings and will be described in detail herein. However, it should be understood that the techniques set forth in the present disclosure are not intended to be limited to the particular forms disclosed. Rather, the invention is to cover all modifications, equivalents and alternatives falling within the spirit and scope of the disclosure as defined by the following appended claims.

We claim:

1. An apparatus associated with a worker identifier comprising: a. a housing; and b. a counter module coupled to the housing, the counter module comprising a wireless communications circuit communicatively coupled with a memory element and a visual display module, the wireless communications circuit receiving incremental measurements of accomplished work associated with the worker identifier as provided within electromagnetic wave signals, the memory element communicatively coupled with the display module and recording a work performance value derived from at least one electromagnetic wave signal, and the visual display module displaying a representation of the work performance value as received from the memory element.

2. The apparatus of claim 1, wherein the wireless communications circuit comprises a radio frequency identification device ("RFID") and the RFID is communicatively coupled with the visual display module and the memory element.

3. The apparatus of claim 2, wherein a visual badge identifier is presented on the housing.

4. The apparatus of claim 3, wherein the visual badge identifier is machine-readable.

5. The apparatus of claim 4, wherein the visual badge identifier is a bar code.

6. The apparatus of claim 1, wherein the counter module further comprises an antenna coupled with a battery, the battery coupled with the visual display module and the memory element, the battery providing electrical energy to the memory element and the visual display module, and the antenna receiving electromagnetic wave energy and to deliver electrical power derived from the electromagnetic wave energy to the battery.

7. The apparatus of claim 1, wherein the memory element further comprises a first badge identifier and the memory element is bi-directionally communicatively coupled with the wireless communications circuit, whereby the apparatus broadcasts the first badge identifier.

8. The apparatus of claim 7, wherein a second badge identifier is presented on the housing.

9. The apparatus of claim 8, wherein the first badge identifier and the second badge identifier comprise an identical identification pattern.

10. The apparatus of claim 8, wherein the second badge identifier is machine-readable.

11. The apparatus of claim 8, wherein the second badge identifier is a bar code.

12. The apparatus of claim 1, further comprising an arithmetic logic circuit coupled with the wireless communications circuit, the arithmetic logic circuit directing the memory element to increment the work performance value upon receipt of an externally sourced signal.

13. The apparatus of claim 1, wherein the memory element further comprises the worker identifier and the memory element is bi-directionally communicatively coupled with the wireless communications circuit, whereby the apparatus broadcasts first badge identifier and the worker identifier.

14. The apparatus of claim 1, wherein the display module further comprises a radio frequency identification device ("RFID") and the RFID is bi-directionally communicatively coupled with the visual display module and the memory element.

15. The apparatus of claim 1 wherein the memory element further comprises a time date stamp, the time date stamp related to a receipt by the apparatus of a specific incremental measurement of accomplished work.

16. The apparatus of claim 15, wherein the apparatus further comprises a real time clock coupled with the memory element, wherein the real time clock provides the time date stamp.

17. A method comprising: a. providing an apparatus to an identified worker, the apparatus comprising: i. a housing; and ii. a counter module coupled to the housing, the counter module comprising a wireless communications circuit, a memory element coupled and a visual display module, the wireless communications circuit receiving incremental measurements of accomplished work as provided within electromagnetic wave signals, the memory element recording a work performance value derived from at least one electromagnetic wave signal, and the visual display module displaying a representation of the work performance value as stored by the memory element; and b. receiving by the apparatus the at least one electromagnetic wave signal comprising an incremental measurement of accomplished work attributed to the identified worker, whereby the apparatus increments the work performance value upon receipt of the incremental measurement of accomplished work and displays the resultant work performance value via the visual display module.

* * * * *